(12) United States Patent
Da Silva et al.

(10) Patent No.: US 11,924,704 B2
(45) Date of Patent: Mar. 5, 2024

(54) CONDITIONAL MOBILITY SELECTION

(71) Applicant: Telefonaktiebolaget LM Ericsson (publ), Stockholm (SE)

(72) Inventors: Icaro L. J. Da Silva, Solna (SE); Johan Rune, Lidingö (SE); Cecilia Eklöf, Täby (SE); Oscar Ohlsson, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 236 days.

(21) Appl. No.: 17/294,875

(22) PCT Filed: Dec. 17, 2019

(86) PCT No.: PCT/IB2019/060942
§ 371 (c)(1),
(2) Date: May 18, 2021

(87) PCT Pub. No.: WO2020/128848
PCT Pub. Date: Jun. 25, 2020

(65) Prior Publication Data
US 2022/0007254 A1    Jan. 6, 2022

Related U.S. Application Data

(60) Provisional application No. 62/781,049, filed on Dec. 18, 2018.

(51) Int. Cl.
*H04W 36/30* (2009.01)
*H04W 36/00* (2009.01)

(52) U.S. Cl.
CPC ....... *H04W 36/30* (2013.01); *H04W 36/0016* (2013.01); *H04W 36/00837* (2018.08); *H04W 36/0085* (2018.08)

(58) Field of Classification Search
None
See application file for complete search history.

(56) References Cited

U.S. PATENT DOCUMENTS

| | | | |
|---|---|---|---|
| 2014/0051443 | A1 | 2/2014 | Diachina et al. |
| 2014/0120921 | A1 | 5/2014 | Keskitalo et al. |

(Continued)

FOREIGN PATENT DOCUMENTS

| | | | |
|---|---|---|---|
| CN | 103718604 A | 4/2014 | |
| CN | 104137608 A | 11/2014 | |

(Continued)

OTHER PUBLICATIONS

"Discussion on Conditional Handover in NR", 3GPP TSG-RAN WG2 Meeting #101, R2-1802008, Athens, Greece, (Resubmission of R2-1800663), Feb. 26-Mar. 2, 2018, pp. 1-6.

(Continued)

*Primary Examiner* — Suhail Khan
(74) *Attorney, Agent, or Firm* — Murphy, Bilak & Homiller, PLLC

(57) ABSTRACT

Embodiments include conditional mobility methods performed by a user equipment (UE) in a wireless network. Such methods include receiving, from a network node via a serving cell, a conditional mobility configuration related to a plurality of mobility procedures, of different types, towards one or more candidate target entities. The conditional mobility configuration includes one or more triggering conditions for the plurality of mobility procedures. Such methods include monitoring for the triggering conditions based on measurements of radio signals associated with the candidate target entities and/or the serving cell. Such methods include, based on detecting a particular triggering condition, performing a particular mobility procedure towards a particular candidate target entity, wherein the particular candidate target entity and/or the particular mobility proce- (Continued)

dure is selected based on a selection rule. Other embodiments include complementary methods performed by a network node, and UEs and network nodes configured to perform such methods.

24 Claims, 18 Drawing Sheets

(56) References Cited

U.S. PATENT DOCUMENTS

| | | | |
|---|---|---|---|
| 2016/0174283 A1 | 6/2016 | Dalsgaard et al. | |
| 2016/0262065 A1 | 9/2016 | Axmon et al. | |
| 2021/0168678 A1* | 6/2021 | Deenoo | H04W 36/0085 |

FOREIGN PATENT DOCUMENTS

| | | |
|---|---|---|
| EP | 3251406 A1 | 12/2017 |
| GB | 201115028 | 10/2011 |
| RU | 2657249 C1 | 6/2018 |
| WO | 2013072271 A1 | 5/2013 |
| WO | 2018083649 A1 | 5/2018 |
| WO | 2018132051 A1 | 7/2018 |
| WO | 2018156696 A1 | 8/2018 |

OTHER PUBLICATIONS

"3GPP TS 33.401 V15.9.0", 3rd Generation Partnership Project; Technical Specification Group Services and System Aspects; 3GPP System Architecture Evolution (SAE); Security architecture (Release 15), Sep. 2019, pp. 1-163.
"3GPP TS 38.401 V15.6.0", 3rd Generation Partnership Project; Technical Specification Group Radio Access Network; NG-RAN; Architecture description (Release 15), Jul. 2019, pp. 1-46.
"3GPP TS 38.473 V15.7.0", 3rd Generation Partnership Project; Technical Specification Group Radio Access Network; NG-RAN; F1 application protocol (F1AP) (Release 15), Sep. 2019, pp. 1-221.
"Introduction of Conditional handover", 3GPP TSG-RAN2#101; R2-1802486; Athens, Greece, Feb. 26-Mar. 2, 2018, pp. 1-5.
"Mobility for NR-U", 3GPP RAN WG2 Meeting #103; R2-1811455; Gothenburg, Sweden, Aug. 20-24, 2018, pp. 1-5.
"Running CR for Introduction of Even further Mobility enhancement in E-UTRAN", 3GPP TSG-RAN2 Meeting #107bis; R2-1913400; Chongqing, China, Oct. 14-18, 2019, pp. 1-58.
"3GPP TS 38.331 V15.6.0", 3rd Generation Partnership Project; Technical Specification Group Radio Access Network; NR; Radio Resource Control (RRC) protocol specification (Release 15), Jun. 2019, pp. 1-519.
"3GPP TS 38.304 V15.0.0", 3rd Generation Partnership Project; Technical Specification Group Radio Access Network; NR; User Equipment (UE) procedures in Idle mode and RRC Inactive state (Release 15), Jun. 2018, pp. 1-25.
"3GPP TS 23.501 V16.3.0", 3rd Generation Partnership Project; Technical Specification Group Services and System Aspects; System architecture for the 5G System (5GS); Stage 2 (Release 16), Dec. 2019, pp. 1-417.
"3GPP TR 38.801 V2.0.0", 3rd Generation Partnership Project; Technical Specification Group Radio Access Network; Study on New Radio Access Technology; Radio Access Architecture and Interfaces (Release 14), Mar. 2017, pp. 1-90.

* cited by examiner

```
-- ASN1START
-- TAG-RRCCONDITIONALRECONFIGURATION-START

RRCConditionalReconfiguration ::=    SEQUENCE {
    rrc-TransactionIdentifier            RRC-TransactionIdentifier,
    criticalExtensions                   CHOICE {
        rrcConditionalReconfiguration        RRCConditionalReconfiguration-IEs,
        criticalExtensionsFuture             SEQUENCE {}
    }
}

RRCConditionalReconfiguration-IEs ::= SEQUENCE {
    condReconfigurationList              SEQUENCE (SIZE (1..maxCondReconfigurations)) OF CondReconfiguration,
    ...
}

CondReconfiguration ::=              CHOICE {
    condHandover                         CondHandover,
    condResume                           CondResume
}

CondHandover ::=                     SEQUENCE {
    rrcReconfigurationToApply            RRCReconfiguration,
    eventTriggerCHO                      ReportConfigNR,
    ...
}

CondResume ::=                       SEQUENCE {
    resumeIdentity                       ShortI-RNTI-Value,
    eventTriggerCHO                      ReportConfigNR,
    targetCandidatecell                  PhysCellId,
    ...
} lateNonCriticalExtension             OCTET STRING                              OPTIONAL,
nonCriticalExtension                 RRCReconfiguration-v1530-IEs              OPTIONAL

-- TAG- RRCCONDITIONALRECONFIGURATION -STOP
-- ASN1STOP
```

FIG. 8

```
-- ASN1START
-- TAG-RRCCONDITIONALRECONFIGURATION-START

RRCConditionalReconfiguration ::=       SEQUENCE {
    rrc-TransactionIdentifier               RRC-TransactionIdentifier,
    criticalExtensions                      CHOICE {
        rrcConditionalReconfiguration           RRCConditionalReconfiguration-IEs,
        criticalExtensionsFuture                SEQUENCE {}
    }
}

RRCConditionalReconfiguration-IEs ::=   SEQUENCE {
    condReconfigurationList                 SEQUENCE (SIZE (1..maxCondReconfigurations)) OF CondReconfiguration,
    condResumeList                          SEQUENCE {
        resumeIdentity                          I-RNTI-Value,
        eventTriggerCHO                         ReportConfigNR,
        listOfCells                             SEQUENCE (SIZE (1..maxNoMonitoredCells)) OF PhysCellID
    }
}

CondReconfiguration::=                  CHOICE {
    condHandover                            CondHandover,
    condResume                              CondResume
}

CondHandover ::=                        SEQUENCE {
    rrcReconfigurationToApply               RRCReconfiguration,
    eventTriggerCHO                         ReportConfigNR
} lateNonCriticalExtension                OCTET STRING                                OPTIONAL,
    nonCriticalExtension                    RRCReconfiguration-v1530-IEs                OPTIONAL

-- TAG- RRCCONDITIONALRECONFIGURATION -STOP
-- ASN1STOP
```

FIG. 9

```
-- ASN1START
-- TAG-RRCCONDITIONALRECONFIGURATION-START

RRCConditionalReconfiguration ::=       SEQUENCE {
    rrc-TransactionIdentifier               RRC-TransactionIdentifier,
    criticalExtensions                      CHOICE {
        rrcConditionalReconfiguration           RRCConditionalReconfiguration-IEs,
        criticalExtensionsFuture                SEQUENCE {}
    }
}

RRCConditionalReconfiguration-IEs ::=   SEQUENCE {
    eventTriggerCHO                         ReportConfigNR,
    condReconfigurationList                 SEQUENCE (SIZE (1..maxCondReconfigurations)) OF CondReconfiguration,
    resumeIdentity                          I-RNTI-Value,
    ...
}

CondReconfiguration::=                  CHOICE {
    condHandover                            CondHandover,
    condResume                              CondResume
}

CondHandover  ::=                       SEQUENCE {
    validityTimer                           ValidityTimerValues,
    rrcReconfigurationToApply               RRCReconfiguration,
    eventTriggerCHO                         ReportConfigNR,
    ...,
    lateNonCriticalExtension                OCTET STRING                            OPTIONAL,
    nonCriticalExtension                    RRCReconfiguration-v1530-IEs            OPTIONAL
}

-- TAG- RRCCONDITIONALRECONFIGURATION -STOP
-- ASN1STOP
```

*FIG. 10*

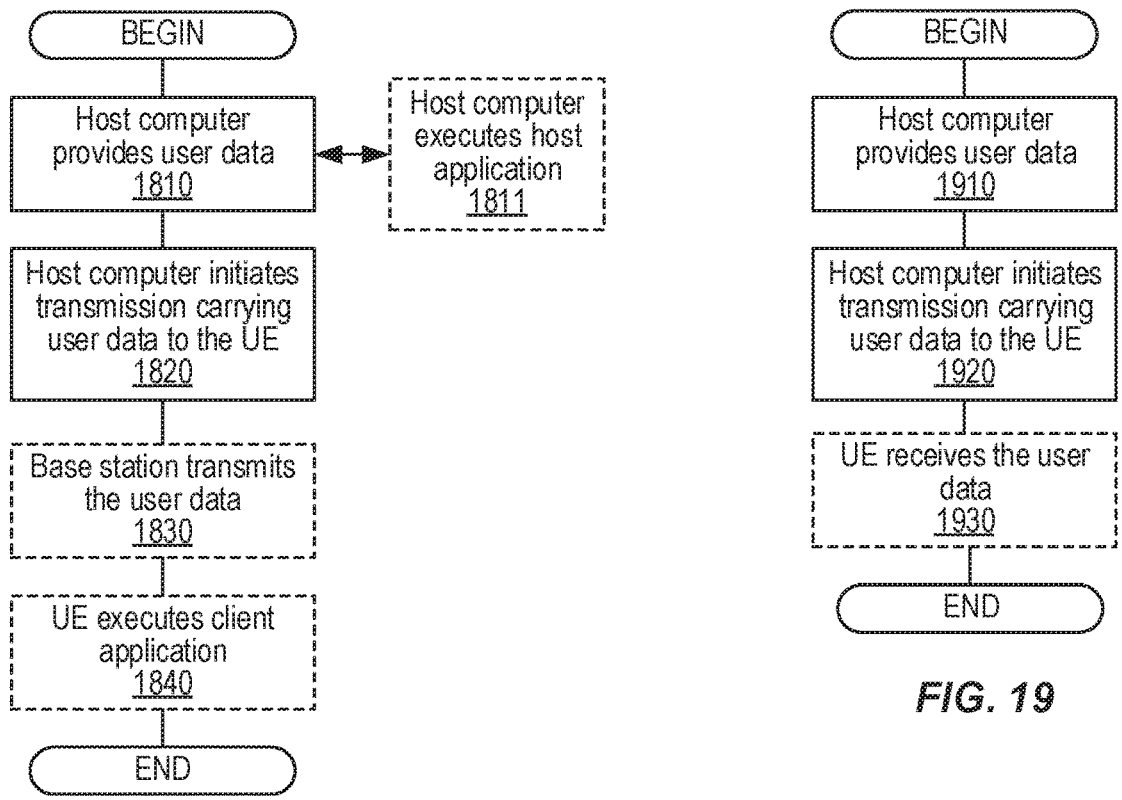
FIG. 18
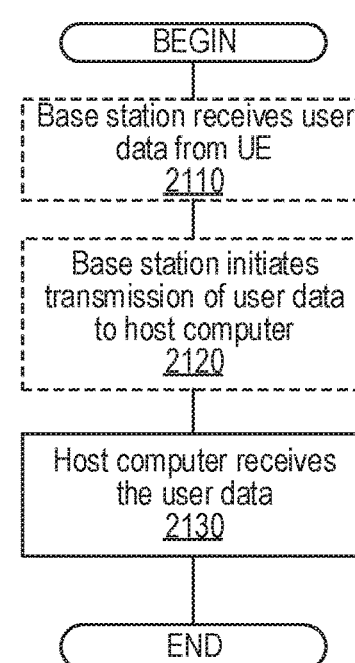
FIG. 19
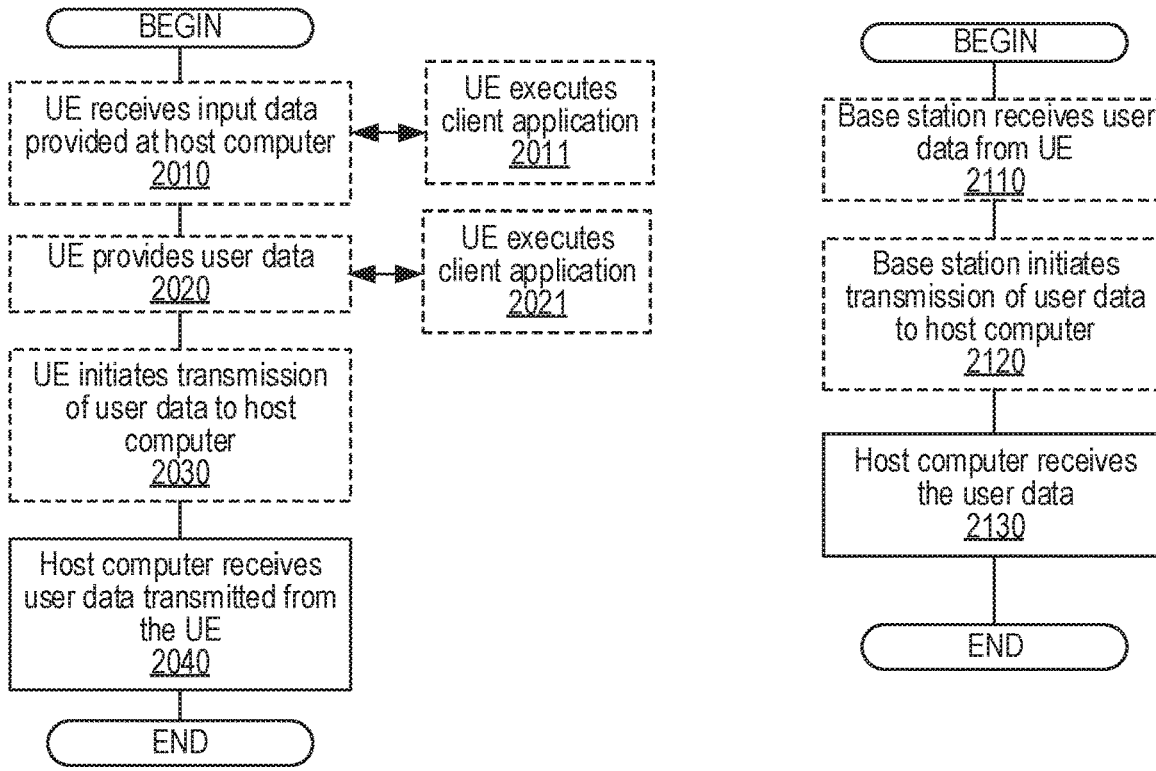
FIG. 20
FIG. 21

CONDITIONAL MOBILITY SELECTION

TECHNICAL FIELD

The present application relates generally to the field of wireless communications, and more specifically to devices, methods, and computer-readable media that improve mobility operations of wireless devices or user equipment (UEs) in a wireless network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, operation, etc. are to be interpreted openly as referring to at least one instance of the element, apparatus, component, means, operation, etc., unless explicitly stated otherwise. The operations of any methods disclosed herein do not have to be performed in the exact order disclosed, unless an operation is explicitly described as following or preceding another operation and/or where it is implicit that an operation must follow or precede another operation. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Long-Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within 3GPP specifications, "user equipment" (or "UE") can refer to any wireless communication device (e.g., smartphone or computing device) that is capable of communicating with 3GPP-standard-compliant network equipment, including E-UTRAN and earlier-generation RANs (e.g., UTRAN/"3G" and/or GERAN/"2G") as well as later-generation RANs in some cases.

As specified by 3GPP, E-UTRAN 100 is responsible for all radio-related functions in the network, including radio bearer control, radio admission control, radio mobility control, scheduling, and dynamic allocation of resources to UEs in uplink (UL) and downlink (DL), as well as security of the communications with the UE. These functions reside in the eNBs, such as eNBs 105, 110, and 115, which communicate with each other via an X1 interface. The eNBs also are responsible for the E-UTRAN interface to EPC 130, specifically the S1 interface to the Mobility Management Entity (MME) and the Serving Gateway (SGW), shown collectively as MME/S-GWs 134 and 138 in FIG. 1.

In general, the MME/S-GW handles both the overall control of the UE and data flow between UEs (such as UE 120) and the rest of the EPC. More specifically, the MME processes the signaling (e.g., control plane, CP) protocols between UEs and EPC 130, which are known as the Non-Access Stratum (NAS) protocols. The S-GW handles all Internet Protocol (IP) data packets (e.g., user plane, UP) between UEs and EPC 130, and serves as the local mobility anchor for the data bearers when a UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Downlink (i.e., network node to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

Uplink (i.e., UE to network node) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the network node in the reception of an associated PUCCH or PUSCH; and sounding reference signals (SRS), which are not associated with any uplink channel.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier bandwidth of 15 kHz. The value of $N_{sc}$ is configurable based upon the available channel bandwidth. Since persons of ordinary skill in the art are familiar with the principles of OFDM, further details are omitted in this description.

Furthermore, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ subcarriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz sub-carrier bandwidth, a PRB pair comprises 168 REs.

The LTE FDD uplink (UL) radio frame is configured in a similar manner as the exemplary FDD DL radio frame discussed above. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the PHY resources. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for network node DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

In LTE, RRC is used to configure/setup and maintain the radio connection between the UE and the network node. When the UE receives an RRC message from the network node, it will apply the configuration, and if this succeeds the UE generates an RRC complete message that indicates the transaction ID of the message that triggered this response.

Since LTE-release 8, three Signaling Radio Bearers (SRBs), namely SRB0, SRB1 and SRB2 have been available for the transport of RRC and Non-Access Stratum (NAS) messages between the UE and network node. A new SRB, known as SRB ibis, was also introduced in rel-13 for supporting DoNAS (Data Over NAS) in NB-IoT. SRB0 is for RRC messages using the CCCH logical channel, and it is used for handling RRC connection setup, RRC connection resume and RRC connection re-establishment. Once the UE is connected to the network node (i.e., RRC connection setup or RRC connection reestablishment/resume has succeeded), SRB1 is used for handling RRC messages (which may include a piggybacked NAS message) as well as for NAS messages prior to the establishment of SRB2, all using DCCH logical channel. On the other hand, SRB2 is used for RRC messages which include logged measurement information as well as for NAS messages, all using DCCH logical channel. SRB2 has a lower priority than SRB1, because logged measurement information and NAS messages can be lengthy and could cause the blocking of more urgent and smaller SRB1 messages. SRB2 is always configured by E-UTRAN after security activation.

As briefly mentioned above, the LTE RRC layer (shown in FIGS. 2B-C) controls communications between a UE and an eNB at the radio interface, as well as the mobility of a UE between cells in the E-UTRAN. A common mobility procedure for UEs in RRC_CONNECTED state (e.g., with an active connection) is handover (HO) between cells. However, handover can have various problems related to robustness. For example, the HO command (e.g., RRCConnectionReconfiguration with mobilityControlInfo or RRCReconfiguration with a reconfigurationWithSync) is normally sent when the radio conditions for the UE are already quite bad. As such, the HO command may need to be segmented (e.g., to allow for redundancy to protect against errors) and/or retransmitted (e.g., using HARQ) one or more times before it reaches the UE. In such case, the HO Command may not reach the UE in time (or at all) before the degraded connection with the source node (e.g., the node hosting the UE's current serving cell) is dropped.

Some "conditional mobility" techniques have been proposed to address these and other difficulties with handovers and other mobility procedures. Nevertheless, these proposed techniques suffer from various deficiencies—with respect to the UE and/or the network—that make them unsuitable in various use cases and/or conditions.

SUMMARY

Exemplary embodiments disclosed herein address these problems, issues, and/or drawbacks of existing solutions by providing a flexible but efficient techniques for configuring a UE not only with a conditional mobility condition (e.g., a threshold) but also with a selection rule for selecting between different conditional mobility operations (e.g., conditional handover or conditional resume) upon the triggering of the conditional mobility condition in a particular candidate target cell (e.g., by UE measurements of at least the candidate target cell).

Exemplary embodiments of the present disclosure include conditional mobility methods (e.g., procedures) performed by a user equipment (UE, e.g., wireless device, IoT device, MTC device, etc. or component thereof) in a wireless network. These exemplary methods can include receiving, from a network node via a serving cell, a conditional mobility configuration related to a plurality of mobility procedures towards one or more candidate target entities. The plurality of mobility procedures can be of different types. In some embodiments, the plurality of mobility procedures can include at least two of the following: conditional handover, conditional resume, conditional re-establishment, conditional primary secondary cell (PSCell) addition, and conditional PSCell change. The conditional mobility configuration can include one or more triggering conditions for the plurality of mobility procedures.

These exemplary methods can also include monitoring for one or more triggering conditions based on measurements of radio signals associated with the candidate target entities and/or the serving cell. These exemplary methods can also include, based on detecting a particular triggering condition (e.g., while monitoring), performing a particular mobility procedure (i.e., of the plurality) towards a particular candidate target entity (i.e., of the one or more). In addition, these exemplary methods can include selecting the particular candidate target entity and/or the particular mobility procedure based on a selection rule. However, it is not necessary that the UE selects both the particular candidate target entity and the particular mobility procedure based on the selection rule; in some embodiments, the UE can determine or select one of these based on one or more different rules, criteria, configurations, etc.

In various embodiments, the candidate target entities can include any of the following: one or more cells, other than the serving cell; one or more frequencies; one or more beams; and one or more reference signals (RS) associated with respective beams. In some embodiments, the candidate target entities include a plurality of candidate target cells, and the particular triggering condition is that a signal strength of the serving cell is a predetermined amount below a signal strength of a particular candidate target cell.

In some embodiments, the conditional mobility configuration can include one or more first configurations, for conditional handover, corresponding to respective one or more first candidate target entities; and one or more second configurations, for conditional resume, corresponding to respective one or more second candidate target entities. For example, the first candidate target entities can include one or more first cells served by the network node, while the second candidate target entities can include more second cells served by other network nodes. As another example, the first candidate target entities can include one or more first cells associated with a first measurement object, while the second candidate target entities include one or more second cells associated with a second measurement object (i.e., different from the first measurement object in some manner).

Furthermore, in such embodiments, each first configuration can include an RRCReconfiguration message prepared by a target node associated with the corresponding first candidate target entity. Likewise, for each particular second candidate target entity, the second configuration can include an identifier of a UE context (e.g., related to a network node associated with the particular second candidate target entity). In such embodiments, selecting the particular mobility procedure based on the selection rule can include selecting conditional handover if the particular candidate target entity is one of the first candidate target entities, and selecting conditional resume if the particular candidate target entity is one of the second candidate target entities.

In some embodiments, each first configuration can include one or more first triggering conditions, and each second configuration can include one or more second triggering conditions. In such embodiments, selecting the particular mobility procedure based on the selection rule can include selecting conditional handover if the particular triggering condition is one of the first triggering conditions, and selecting conditional resume if the particular triggering condition is one of the second triggering conditions. In some of these embodiments, the first candidate target entities and the second candidate target entities can include a common candidate target entity, and the first and second triggering conditions associated with the common candidate target entity can be different.

In some embodiments, the particular triggering condition can be that a signal strength of the serving cell is a predetermined amount below a first threshold. In such embodiments, the candidate target entities can include a plurality of frequencies arranged in order of priority, and a plurality of candidate target cells. In such embodiments, selecting based on the selection rule can include determining signal strengths of the candidate target cells for the highest-priority frequency, and selecting the candidate target cell with the highest signal strength if any of the determined signal strengths for the candidate target cells is above a second threshold. Otherwise, if none of the determined signal strengths for the candidate target cells is above the second threshold, the UE can repeat these determining and selection operations for the next highest-priority frequency.

In some embodiments, the conditional mobility configuration can include one or more validity timers, with each validity timer being associated with one or more of the mobility procedures and/or at least one of the candidate target entities. In such embodiments, the monitoring operations can include initiating the validity timers. Furthermore, in such embodiments, selecting based on the selection rule can be further based on whether a validity timer associated with the particular mobility procedure and the particular candidate target entity has expired.

Other exemplary embodiments include methods (e.g., procedures) for configuring conditional mobility of a user equipment (UE) in a wireless network. These exemplary methods can be performed by a network node (e.g., base stations, eNBs, gNBs, etc. or components thereof) in the wireless network (e.g., E-UTRAN, NG-RAN).

These exemplary methods can include determining, for the UE, a conditional mobility configuration related to a plurality of mobility procedures towards one or more candidate target entities. The plurality of mobility procedures can be of different types. In some embodiments, the plurality of mobility procedures can include at least two of the following: conditional handover, conditional resume, conditional re-establishment, conditional primary secondary cell (PSCell) addition, and conditional PSCell change. The conditional mobility configuration can also include one or more triggering conditions for the plurality of mobility procedures.

These exemplary methods can also include sending the conditional mobility configuration to the UE via a serving cell.

In various embodiments, the candidate target entities can include any of the following: one or more cells, other than the serving cell; one or more frequencies; one or more beams; and one or more reference signals (RS) associated with respective beams. In some embodiments, the candidate target entities can include a plurality of candidate target cells, and one of the triggering conditions is that a signal strength of the serving cell is a predetermined amount below a signal strength of a particular candidate target cell.

In some embodiments, the conditional mobility configuration can include one or more first configurations, for conditional handover, corresponding to respective one or more first candidate target entities; and one or more second configurations, for conditional resume, corresponding to respective one or more second candidate target entities. For example, the first candidate target entities can include one or more first cells served by the network node, while the second candidate target entities can include more second cells served by other network nodes. As another example, the first candidate target entities can include one or more first cells associated with a first measurement object, while the second candidate target entities include one or more second cells associated with a second measurement object (i.e., different from the first measurement object in some manner).

Furthermore, in such embodiments, each first configuration can include an RRCReconfiguration message prepared by a target node associated with the corresponding first candidate target entity. Likewise, for each particular second candidate target entity, the second configuration can include an identifier of a UE context (e.g., related to a network node associated with the particular second candidate target entity). In some embodiments, the first configuration can include one or more first triggering conditions, and the second configuration can include one or more second triggering conditions. In such embodiments, the first candidate target entities and the second candidate target entities can include a common candidate target entity, and the first and second triggering conditions associated with the common candidate target entity can be different.

In some embodiments, one of the triggering conditions can be that a signal strength of the serving cell is a predetermined amount below a first threshold. In such embodiments, the candidate target entities can include a plurality of frequencies arranged in order of priority, and a plurality of candidate target cells. In some embodiments, the conditional mobility configuration can include one or more validity timers, with each validity timer being associated with one or more of the mobility procedures and/or at least one of the candidate target entities.

Other exemplary embodiments include UEs (e.g., wireless devices, IoT devices, MTC devices, etc. or component thereof) or network nodes (e.g., base stations, eNBs, gNBs, etc. or components thereof) configured to perform operations corresponding to any of the exemplary methods described herein. Other exemplary embodiments include non-transitory, computer-readable media storing program instructions that, when executed by processing circuitry, configure such UEs or network nodes to perform operations corresponding to any of the exemplary methods described herein.

These and other objects, features and advantages of exemplary embodiments of the present disclosure will become apparent upon reading the following Detailed Description in view of the Drawings briefly described below.

BRIEF DESCRIPTION OF THE DRAWINGS

FIG. 4, which is divided into

FIGS. 8-10 show ASN.1 data structures that define exemplary RRCConditional-Reconfiguration messages sent by a network node to a UE, according to various exemplary embodiments of the present disclosure.

FIGS. 18-21 are flow diagrams illustrating exemplary methods and/or procedures implemented in a communication system, according to various exemplary embodiments of the present disclosure.

DETAILED DESCRIPTION

Figure 1:
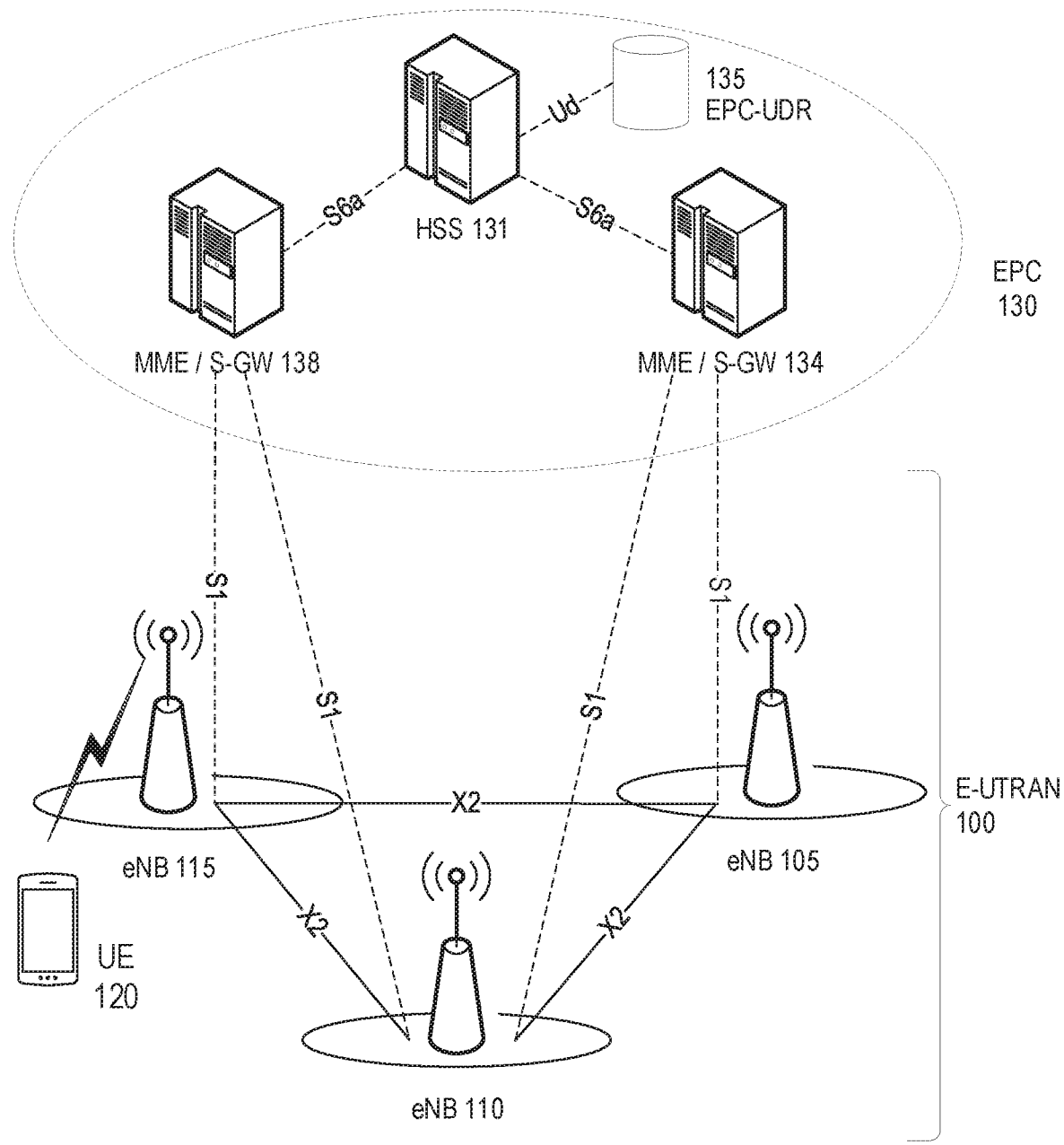
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
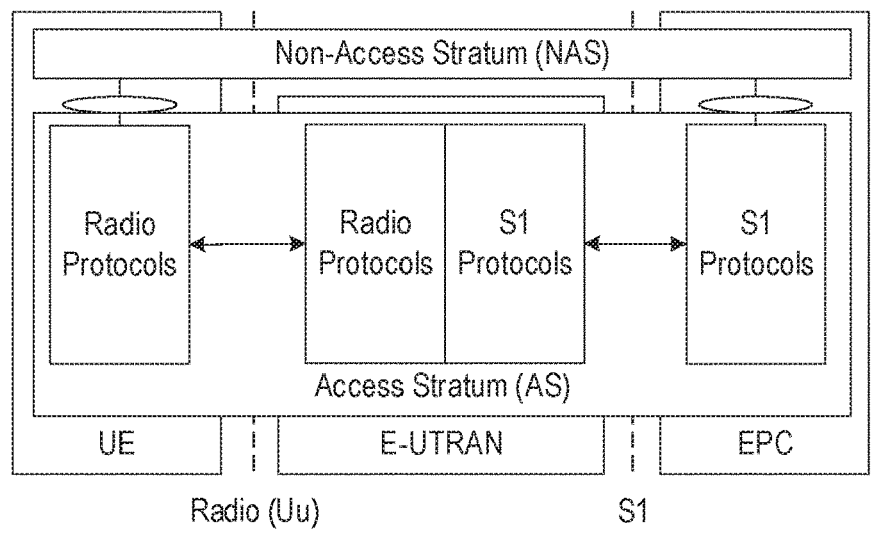
FIG. 2A is a high-level block diagram of an exemplary E-UTRAN architecture in terms of its constituent components, protocols, and interfaces.
Figure 2B:
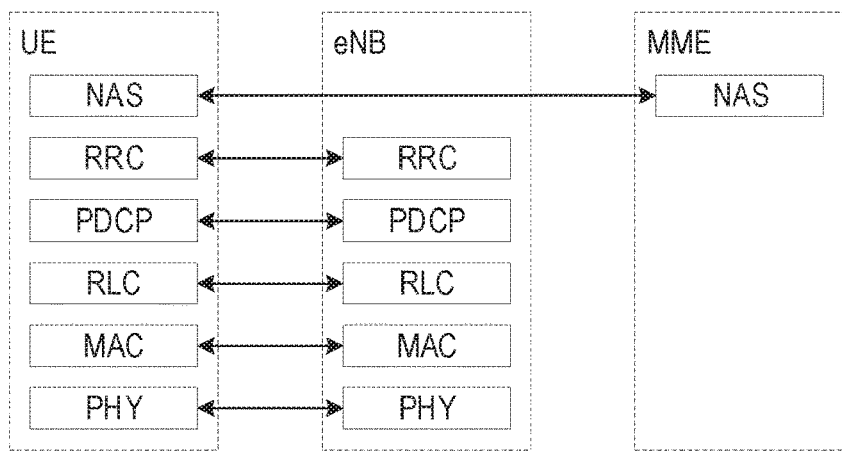
FIG. 2B is a block diagram of exemplary protocol layers of the control-plane portion of the radio (Uu) interface between a user equipment (UE) and the E-UTRAN.
Figure 2C:
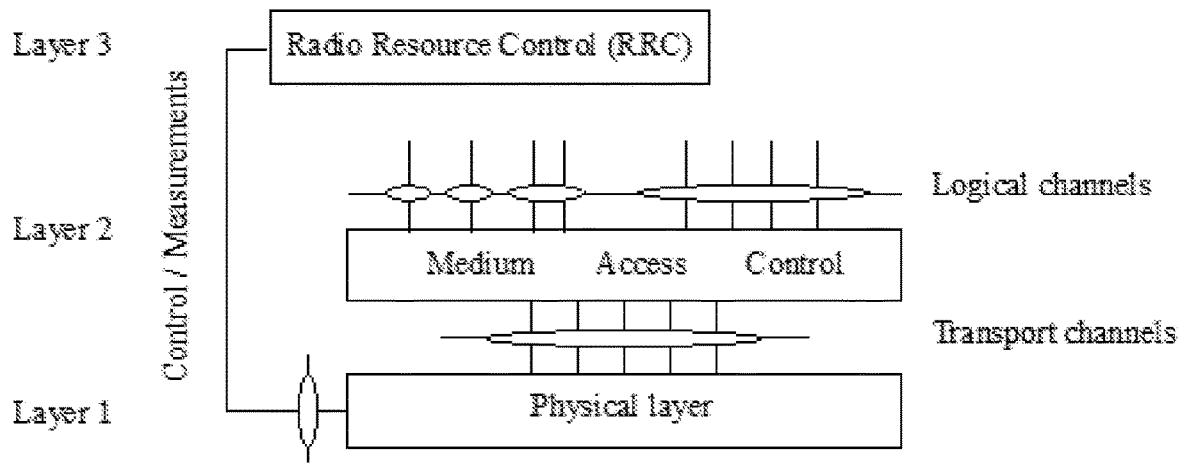
FIG. 2C is a block diagram of an exemplary LTE radio interface protocol architecture from the perspective of the PHY layer.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/ or receive signals. Some examples of a radio access node include, but are not limited to, a base station (e.g., a New Radio (NR) base station (gNB) in a 3GPP Fifth Generation (5G) NR network or an enhanced or evolved Node B (network node) in a 3GPP LTE network), a high-power or macro base station, a low-power base station (e.g., a micro base station, a pico base station, a home eNB, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a communications network. Functionally, a network node is equipment capable, configured, arranged, and/or operable to communicate directly or indirectly with a wireless device and/or with other network nodes or equipment in the communications network, to enable and/or provide wireless access to the wireless device, and/or to perform other functions (e.g., administration) in the communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, UE mobility procedures (e.g., handover) can have various problems related to robustness. For example, a HO command is normally sent when the radio conditions for the UE are already quite bad. As such, the HO command may need to be segmented (e.g., to allow for redundancy to protect against errors) and/or retransmitted (e.g., using HARQ) one or more times before it reaches the UE. In such case, the HO command may not reach the UE in time (or at all) before the degraded connection with the source node (e.g., the node hosting the UE's current serving cell) is dropped. Some "conditional mobility" techniques have been proposed to address these and other difficulties with handovers and other mobility procedures. Nevertheless, these proposed techniques suffer from various deficiencies with respect to the UE and/or the network that make them unsuitable in various scenarios. These issues are discussed in more detail below.

Prior to Rel-13, there were two RRC states defined for a UE. More specifically, after a UE is powered ON it will be in the RRC_IDLE state until an RRC connection is established, at which time it will transition to RRC_CONNECTED state (e.g., where data transfer can occur). After a connection is released, the UE returns to RRC_IDLE. In RRC_IDLE state, the UE's radio is active on a discontinuous reception (DRX) schedule configured by upper layers. During DRX active periods, an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the EPC and has an assigned IP address, but is not known to the serving eNB (e.g., there is no stored context).

In LTE Rel-13, a mechanism was introduced for the UE to be suspended by the network in a suspended state similar to RRC_IDLE but with some important differences. First, the suspended state is not a third RRC "state" alongside RRC_IDLE and RRC_CONNECTED; rather it can be viewed as a "substate" of RRC_IDLE. Second, both the UE and the serving eNB store the UE's AS (e.g., S1-AP) context and RRC context after suspension. When the suspended UE needs to resume a connection (e.g., to send UL data), instead of going through the conventional service request procedure, the suspended UE merely sends an RRCConnectionResumeRequest message to the eNB. The eNB resumes the S1AP context and responds with a RRCConnectionResume message. There is no elaborate exchange of security context between MME and eNB and no setup of AS security context. The preserved AS and RRC contexts are merely resumed from where they were suspended earlier. Reducing the signaling can provide reduced UE latency (e.g., for smart phones accessing Internet) and reduced UE signaling, which can lead to reduced UE energy consumption, particularly for machine type communication (MTC) devices that send very little data (i.e., signaling being a primary consumer of energy).

To support mobility (e.g., handover or reselection) between cells and/or beams, a UE can perform periodic cell search and measurements of signal power and quality (e.g., reference signal received power, RSRP, and reference signal received quality, RSRQ) in both RRC_CONNECTED and RRC_IDLE modes. The UE is responsible for detecting new neighbor cells, and for tracking and monitoring already detected cells. The detected cells and the associated measurement values are reported to the network. An LTE UE can perform such measurements on various downlink reference signals (RS) including, e.g., cell-specific Reference Signal (CRS), MBSFN RS, UE-specific demodulation RS (DM-RS) associated with PDSCH, DM-RS associated with EPDCCH or M/NPDCCH, positioning RS (PRS), and channel state information RS (CSI-RS).

UE measurement reports to the network can be configured to be periodic or aperiodic based a particular event. For example, the network can configure a UE to perform measurements on various carrier frequencies and various RATs corresponding to neighbor cells, as well as for various purposes including, e.g., mobility and/or positioning. The configuration for each of these measurements is referred to as a "measurement object." Furthermore, the UE can be configured to perform the measurements according to a "measurement gap pattern" (or "gap pattern" for short), which can include a measurement gap repetition period (MGRP) (i.e., how often a regular gap available for measurements occurs) and a measurement gap length (MGL) (i.e., the length of each recurring gap).

In LTE, the concept of Time-To-Trigger (TTT) is used to ensure that the event triggering criterion is satisfied for a long enough duration before a measurement report is sent by the UE. The triggering criterion and TTT are configured in a reportConfig message (or an information element, IE, of a message) sent by the network to the UE. The value of TTT provided in reportConfig is applicable to all neighbor cells of the UE that could trigger a measurement report based on the specified triggering criterion.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher.

Similar to LTE, the NR PHY uses CP-OFDM (Cyclic Prefix Orthogonal Frequency Division Multiplexing) in the DL and both CP-OFDM and DFT-spread OFDM (DFT-S-OFDM) in the UL. In the time domain, NR DL and UL physical resources are organized into equal-sized, 1-ms subframes. Each subframe includes of one or more slots, and each slot includes 14 (for normal cyclic prefix) or 12 (for extended cyclic prefix) time-domain symbols.

Figure 3:
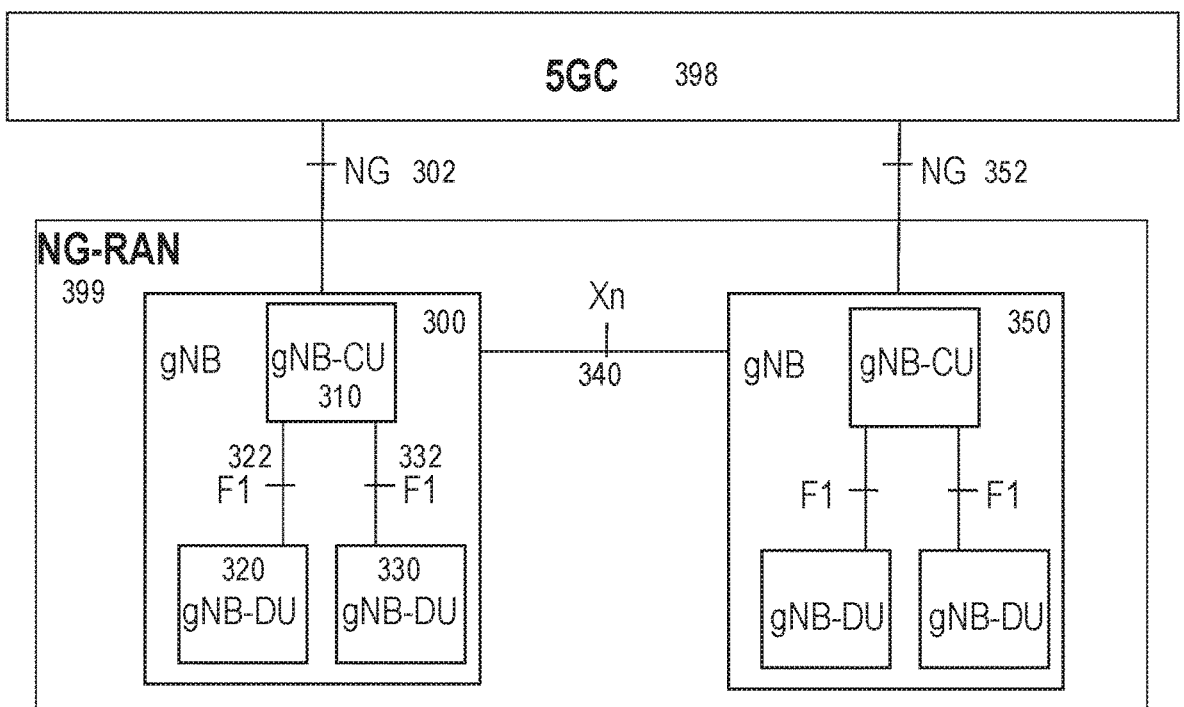
FIG. 3 illustrates a high-level view of an exemplary 5G network architecture, including split central unit (CU)-distributed unit (DU) architecture of gNBs.

FIG. 3 illustrates a high-level view of the 5G network architecture, including a next generation RAN (NG-RAN) 399 and a 5G core network (5GC) 398. NG-RAN 399 can include one or more gNodeB's (gNBs) connected to the 5GC via one or more NG interfaces, such as gNBs 300, 350 connected via interfaces 302, 352, respectively. More specifically, gNBs 300, 350 can be connected to one or more Access and Mobility Management Functions (AMF) in the 5GC 398 via respective NG-C interfaces. Similarly, gNBs 300, 350 can be connected to one or more User Plane Functions (UPFs) in 5GC 398 via respective NG-U interfaces.

Although not shown, in some deployments 5GC 398 can be replaced by an Evolved Packet Core (EPC), which conventionally has been used together with LTE E-UTRAN. In such deployments, gNBs 300, 350 can connect to one or more Mobility Management Entities (MMEs) in EPC via respective S1-C interfaces. Similarly, gNBs 300, 350 can connect to one or more Serving Gateways (SGWs) in EPC via respective NG-U interfaces.

In addition, the gNBs can be connected to each other via one or more Xn interfaces, such as Xn interface 340 between gNBs 300 and 350. The radio technology for the NG-RAN is often referred to as "New Radio" (NR). For the NR interface to UEs, each of the gNBs can support frequency division duplexing (FDD), time division duplexing (TDD), or a combination thereof.

NG-RAN 399 can be partitioned into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501. If security protection for CP and UP data on TNL of NG-RAN interfaces is supported, NDS/IP (3GPP TS 33.401) shall be applied.

The NG-RAN logical nodes shown in FIG. 3 (and described in 3GPP TS 38.401 and 3GPP TR 38.801) include a Central Unit (CU or gNB-CU) and one or more Distributed Units (DU or gNB-DU). For example, gNB 300 includes gNB-CU 310 and gNB-DUs 320 and 330. CUs (e.g., gNB-CU 310) are logical nodes that host higher-layer protocols and perform various gNB functions such controlling the operation of DUs. A DU (e.g., gNB-DUs 320, 330) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 322 and 332 shown in FIG. 3. However, a gNB-DU can be connected to only a single gNB-CU. The gNB-CU and connected gNB-DU(s) are only visible to other gNBs and the 5GC as a gNB. In other words, the F1 interface is not visible beyond gNB-CU. Furthermore, the F1 interface between the gNB-CU and gNB-DU is specified and/or based on the following general principles:

F1 is an open interface;
F1 supports the exchange of signaling information between respective endpoints, as well as data transmission to the respective endpoints;
from a logical standpoint, F1 is a point-to-point interface between the endpoints (even in the absence of a physical direct connection between the endpoints);
F1 supports control plane (CP) and user plane (UP) separation, such that a gNB-CU may be separated in CP and UP;
F1 separates Radio Network Layer (RNL) and Transport Network Layer (TNL);
F1 enables exchange of user-equipment (UE) associated information and non-UE associated information;
F1 is defined to be future proof with respect to new requirements, services, and functions;
A gNB terminates X2, Xn, NG and S1-U interfaces and, for the F1 interface between DU and CU, utilizes the F1 application part protocol (F1-AP) which is defined in 3GPP TS 38.473.

Furthermore, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized UP protocols (e.g., PDCP-U).

Figure 4A:
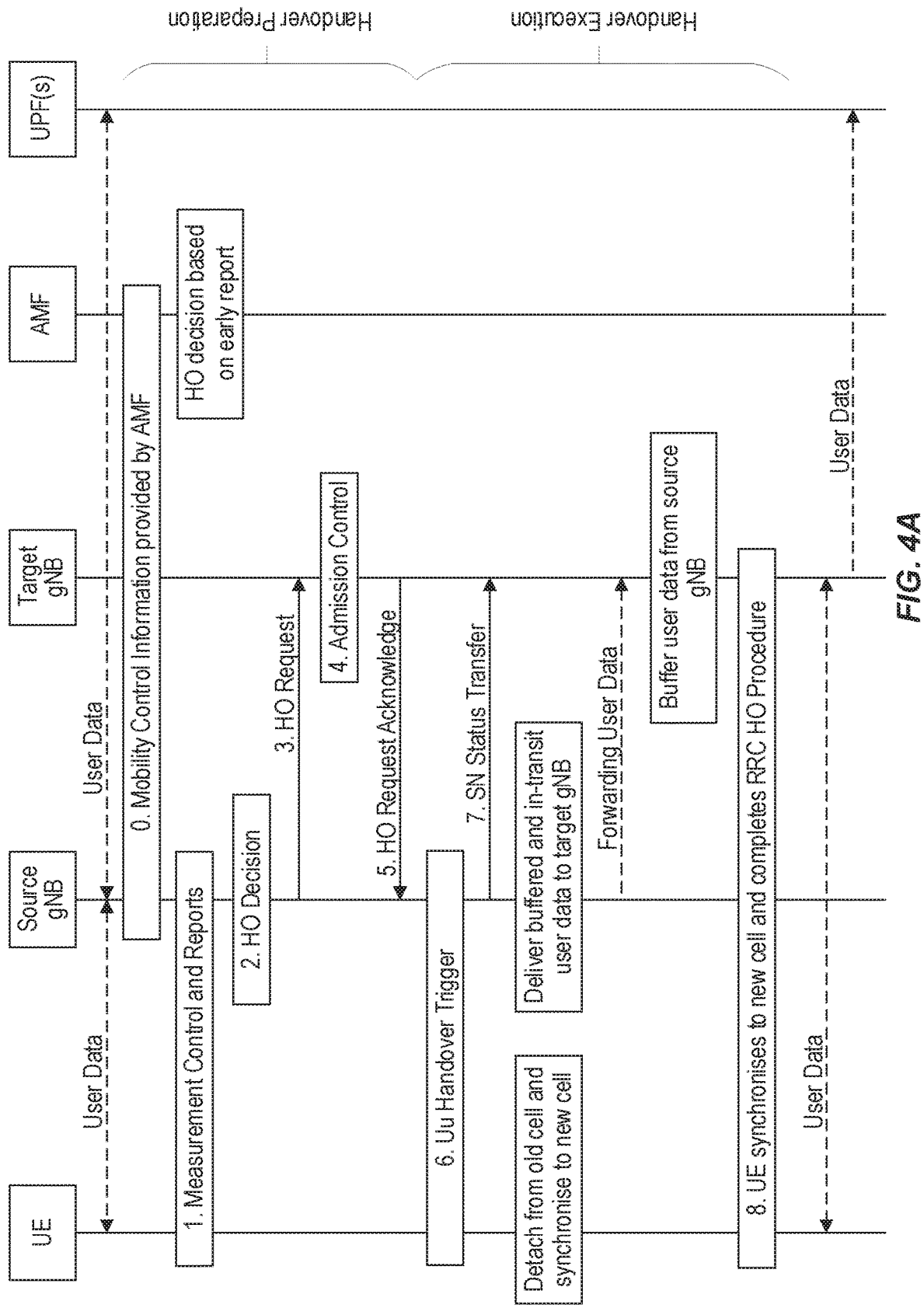
FIGS. 4A and 4B, illustrates an exemplary signaling flow between a UE, a source node (e.g., source gNB), and a target node (e.g., target gNB) during a handover procedure in an NR network.
Figure 4B:
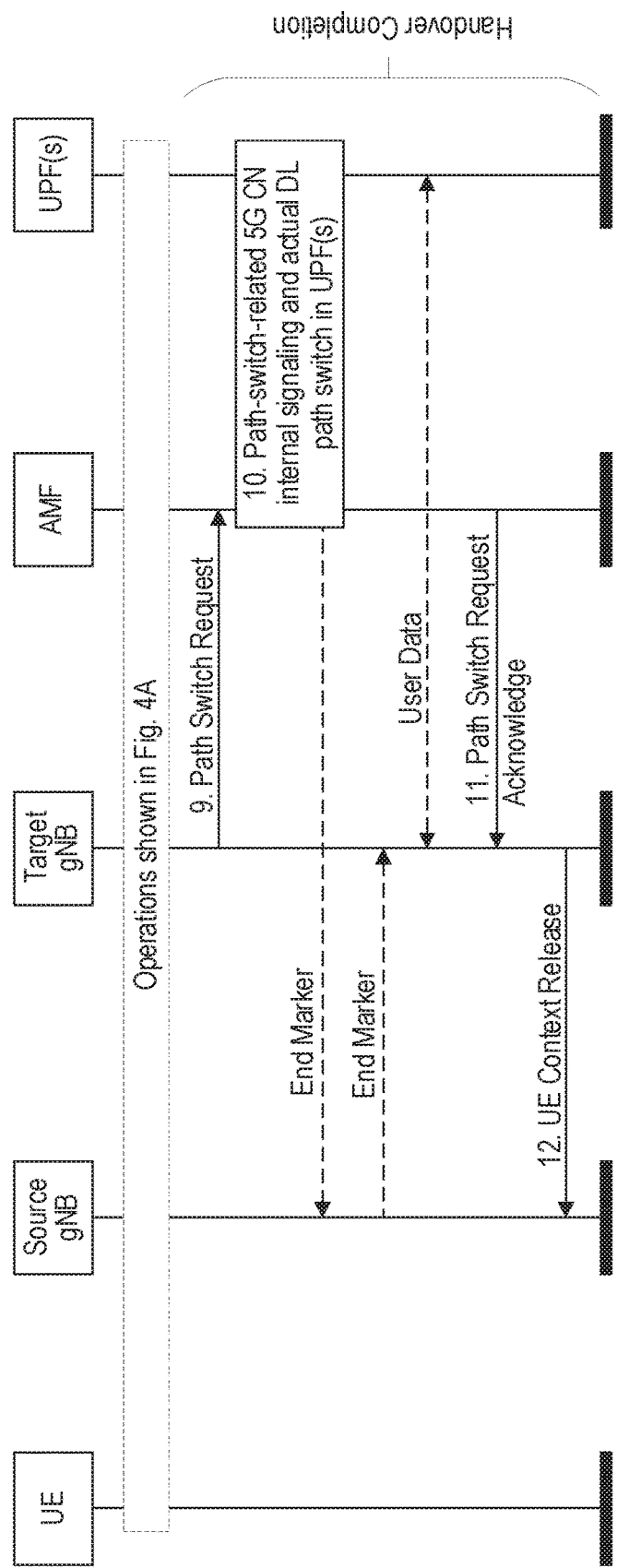

FIG. 4, which is divided into FIGS. 4A and 4B, illustrates the signaling flow between a UE, a source node (e.g., source gNB), and a target node (e.g., target gNB) during a handover procedure in an NR network. FIG. 4 also illustrates the roles of 5GC functions including access management function (AMF) and user-plane function (UPF). Even so, the following discussion addresses various principles related to HO (or more generally, UE mobility while in RRC_CONNECTED mode) in both NR and LTE networks.

First, UE mobility in RRC_CONNECTED is network-based, since the network has the most recent and/or most accurate information regarding load conditions, resources in different nodes, available frequencies, etc. The network can also take into account the situation of many UEs in the network, from a resource allocation perspective.

As illustrated in FIG. 4, the network prepares a target cell before the UE accesses that cell. The source node provides the UE with the RRC configuration to be used in the target cell, including SRB1 configuration (e.g., parameters from which to derive keys for encryption/integrity protection) to send the HO complete message (e.g., RRCConnectionReconfigurationComplete). The target node provides the UE with a target C-RNTI, so that the target node can identify the UE from random-access msg3 on MAC level for the HO complete message. Hence, unless a failure occurs, there is no need for the target node to perform UE context fetching.

Furthermore, to speed up the HO, the source node provides the UE with needed information on how to access the target (e.g., RACH configuration), so the UE does not have to acquire target node system information (SI, e.g., from broadcast) prior to the handover. Both full and delta reconfiguration are supported so that the HO command can be minimized. The UE may be provided with contention-free random-access (CFRA) resources; in that case, the target node can identify the UE from the RACH preamble (also referred to as msg1). More generally, the normal HO procedure can always be optimized with dedicated resources, such as CFRA resources.

The HO process shown in FIG. 4 has various problems related to robustness. For example, the HO command (e.g., RRCConnectionReconfiguration with mobilityControlInfo or RRCReconfiguration with a reconfigurationWithSync) is normally sent when the radio conditions for the UE are already quite bad. As such, the HO command may need to be segmented (e.g., to allow for redundancy to protect against errors) and/or retransmitted (e.g., using HARQ) one or more times before it reaches the UE. In such case, the HO Command may not reach the UE in time (or at all) before the degraded connection with the target node is dropped.

One way to combat such failures is "conditional handover," briefly mentioned above. One type of conditional handover solution discussed in 3GPP RAN2 WG is "early HO command" or "conditional HO command" In order to avoid the undesired dependence of the serving radio link upon the time (and radio conditions) when the UE should execute the handover, RRC signaling for the handover command can be provided earlier to the UE. In such case, the handover command can be associated with a condition that, once fulfilled, enables the UE to execute the handover in accordance with the provided handover command. An example condition could be that a candidate target cell becomes X dB better than a source cell (e.g., based on a particular signal-strength metric), which is similar to a condition associated with an "A3" event.

Figures 5, 6:
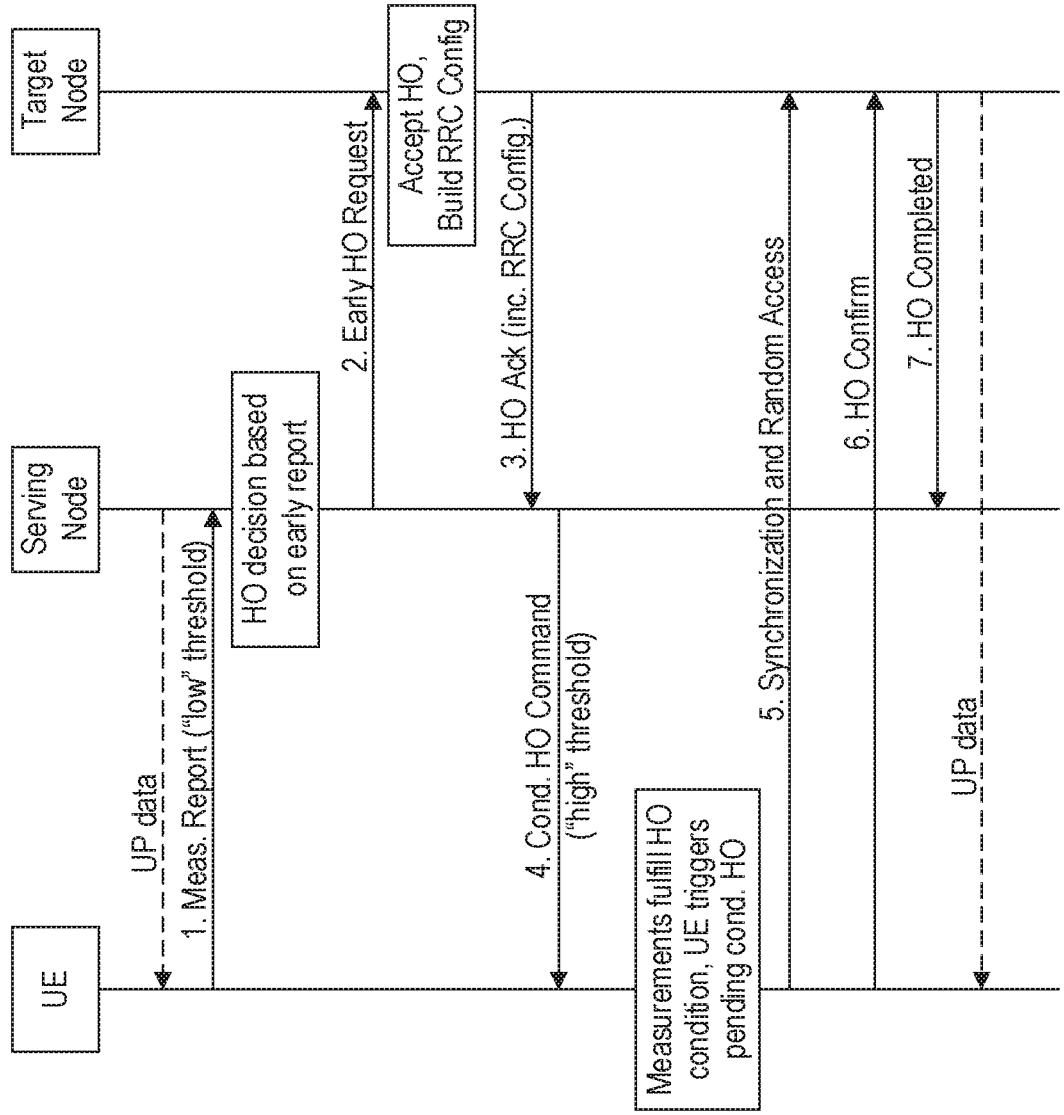
FIG. 5 shows an exemplary signal flow between a user equipment (UE), a serving node, and a target node for a conditional handover (HO) procedure, according to exemplary embodiments of the present disclosure.
FIG. 6 shows NR radio resource control (RRC) states and procedures by which a UE transitions between the NR RRC states.

FIG. 5 illustrates an exemplary signal flow between a user equipment (UE), a serving network node, and a target network node for a conditional handover (HO), according to exemplary embodiments of the present disclosure. The serving and target network nodes can be, e.g., gNBs and/or components of gNBs, such as CUs and/or DUs.

This procedure involves two different measurement thresholds: a low threshold ("Y") and a high threshold ("X"). The two thresholds can be expressed as different levels of a particular metric, e.g., signal strength, signal quality, etc. For example, the high threshold could be that the quality of the mobility RS (MRS) of the candidate target cell or beam becomes X dB stronger than the MRS of the serving cell, with the low threshold "Y" being less than "X" (i.e., target exceeds serving by lower amount). As used in this context, MRS denotes a reference signal used for any mobility-related purpose. For example, in NR, MRS can be either SSB (SS/PBCH block) or CSI-RS. As a further example, for NR operating in unlicensed spectrum (referred to as NR-U), MRS can be a discovery reference signal (DRS) in addition to any of the signals mentioned above.

The UE can be provided with a measurement configuration including the low threshold "Y". Upon performing measurements that meet the low threshold "Y", the UE can send a measurement report to the serving node. While performing the measurements and evaluating the threshold "Y", the UE continues operating in its current RRC configuration. Based on this report, the serving node can decide to request an early handover of the UE to the target node (e.g., to a target cell indicated in the measurement report). The target network node performs admission control for the UE and responds with the handover acknowledgement that includes RRC configuration, similar to the basic handover shown in FIG. 4. The serving node then sends the UE a "Conditional HO Command", which can include the high threshold "X". Upon receiving this command, the UE continues to perform measurements and whenever the condition "X" is met, it can move to the target network node and performs the handover. Even so, it is that the UE stays in the serving cell for an extended amount of time in case the HO condition is not fulfilled.

There are several possible enhancements to the baseline conditional HO shown in FIG. 5. First, the network can decide to provide an updated conditional HO command (e.g., RRCConnectionReconfiguration or RRCReconfiguration message) for a candidate target cell for which it had previously provided a conditional HO command. Second, the source network node can request the target network node to prolong the conditional HO command validity. If granted by the target, the source can send a new time limit to UE for the conditional HO command that allows more time before the conditional HO command is triggered. Third, the source network node can decide based on the RRM measurements that the candidate target cell must be changed. In this scenario, the source network node provides the conditional HO command to the UE with a new candidate target cell and indicates that the UE shall discard the earlier provided conditional HO command.

Fourth, it may be possible and/or desirable to provide the UE with HO conditions and configurations for several candidate target cells. Each candidate target cell is associated with (e.g., provided by) a single target node (which can be considered a "candidate target node"), but a target node can be associated with one or more candidate target cells. When receiving conditional HO commands for multiple candidate target cells, the UE evaluates HO conditions for multiple candidate target cell and stores configurations for those individually. In one technique, the network informs the UE that the conditional HO command is applicable for several cells. Alternatively, the network provides conditional HO command with multiple cells and potentially multiple configurations.

In conditional HO, the network provides the UE with a configuration to access a prepared candidate target cell so that the UE may transmit UL data as soon as the UE synchronizes with the target cell, e.g., by multiplexing UL data with an RRCReconfigurationComplete message. The configuration to access a candidate target cell is prepared by the target node controlling the candidate target cell and provided in the conditional HO command. However, conditional HO requires that such a message is prepared and that resources for the UE are allocated in each candidate target cell. In addition, it may be necessary for a serving/source node to contact each previously-configured target node (e.g., associated with the respective candidate target cells) with updates to prepare a new conditional HO message and/or to cancel allocated resources.

As part of the 3GPP standardization work on 5G, it has been decided that NR should support an RRC_INACTIVE state with similar properties as the suspended state in LTE Rel-13. The RRC_INACTIVE state has slightly different properties in that it is a separate RRC state and not part of RRC_IDLE as in LTE. Additionally, the CN/RAN connection (NG or N2 interface) is kept alive during RRC_INACTIVE while it was suspended in LTE.

FIG. 6 shows NR RRC states and procedures by which a UE transitions between the NR RRC states. The properties of the states shown in FIG. 6 are summarized as follows:

RRC_IDLE:
A UE specific DRX may be configured by upper layers;
UE controlled mobility based on network configuration;
The UE:
   Monitors a Paging channel for CN paging using 5G-S-TMSI;
   Performs neighbor cell measurements and cell (re-)selection; and
   Acquires system information.

RRC_INACTIVE:
A UE specific DRX may be configured by upper layers or by RRC layer;
UE controlled mobility based on network configuration;
The UE stores the AS context;
The UE:
   Monitors a Paging channel for CN paging using 5G-S-TMSI and RAN paging using I-RNTI;
   Performs neighbor cell measurements and cell (re-)selection;
   Performs RAN-based notification area updates periodically and when moving outside the RAN-based notification area;
   Acquires system information.

RRC_CONNECTED:
The UE stores the AS context.
Transfer of unicast data to/from UE.
At lower layers, the UE may be configured with a UE specific DRX;
For UEs supporting CA, use of one or more SCells, aggregated with the SpCell, for increased bandwidth;
For UEs supporting DC, use of one SCG, aggregated with the MCG, for increased bandwidth;
Network controlled mobility, i.e. handover within NR and to/from E-UTRAN.
The UE:
  Monitors a Paging channel;
  Monitors control channels associated with the shared data channel to determine if data is scheduled for it;
  Provides channel quality and feedback information;
  Performs neighbor cell measurements and measurement reporting;
  Acquires system information.

As shown in FIG. 6, the transitions between RRC_INACTIVE and RRC_CONNECTED states are realized by two new procedures: "Suspend" (also called RRC connection release with SuspendConfig) and "Resume." A gNB can suspend a connection and move a UE from RRC_CONNECTED to RRC_INACTIVE by sending the UE an RRCRelease message with suspend indication (or configuration). This can happen, for example, after the UE has been inactive for a certain period, causing a gNB internal inactivity timer to expire. Upon moving RRC_INACTIVE, both the UE and gNB store the UE's access stratum (AS) context and the associated identifier (referred to as I-RNTI).

Likewise, a UE can attempt to resume a connection toward a particular gNB (e.g., same or different cell from which the connection was suspended) by sending the gNB an RRCResumeRequest message including the I-RNTI, a security token (called resumeMAC-I) used to identify and verify the UE at RRC connection resume, and an indication of the resume cause (e.g., mobile originated data). The gNB serving the cell in which the UE attempts to resume is often referred to as "target gNB," while the gNB serving the cell in which the UE was suspended is often referred to as the "source gNB." To resume the connection, the target gNB identifies the source gNB (e.g., from a portion of the I-RNTI) and requests that gNB to send the UE's context. In this request, the target gNB provides, among other things, a target cell ID, a UE ID, and security token received from the UE. The NR resume procedure is similar in some ways to the corresponding resume procedure in LTE (e.g., E-UTRAN and EPC) and eLTE (e.g., E-UTRAN and 5GC).

The resume procedure discussed above can also be adapted into another conditional mobility solution called "conditional resume," which has properties similar to conditional HO shown in FIG. 5. More specifically, the UE can be provided with a low threshold "Y" to trigger measurement reporting while in RRC_INACTIVE state, and in response to reported measurements, a serving node can provide the UE with a "conditional resume" command that includes a high threshold "X" for triggering a resume towards a target cell provided by a target node. Unlike conditional HO, however, conditional resume relies on context fetching by the target node.

Figure 7:
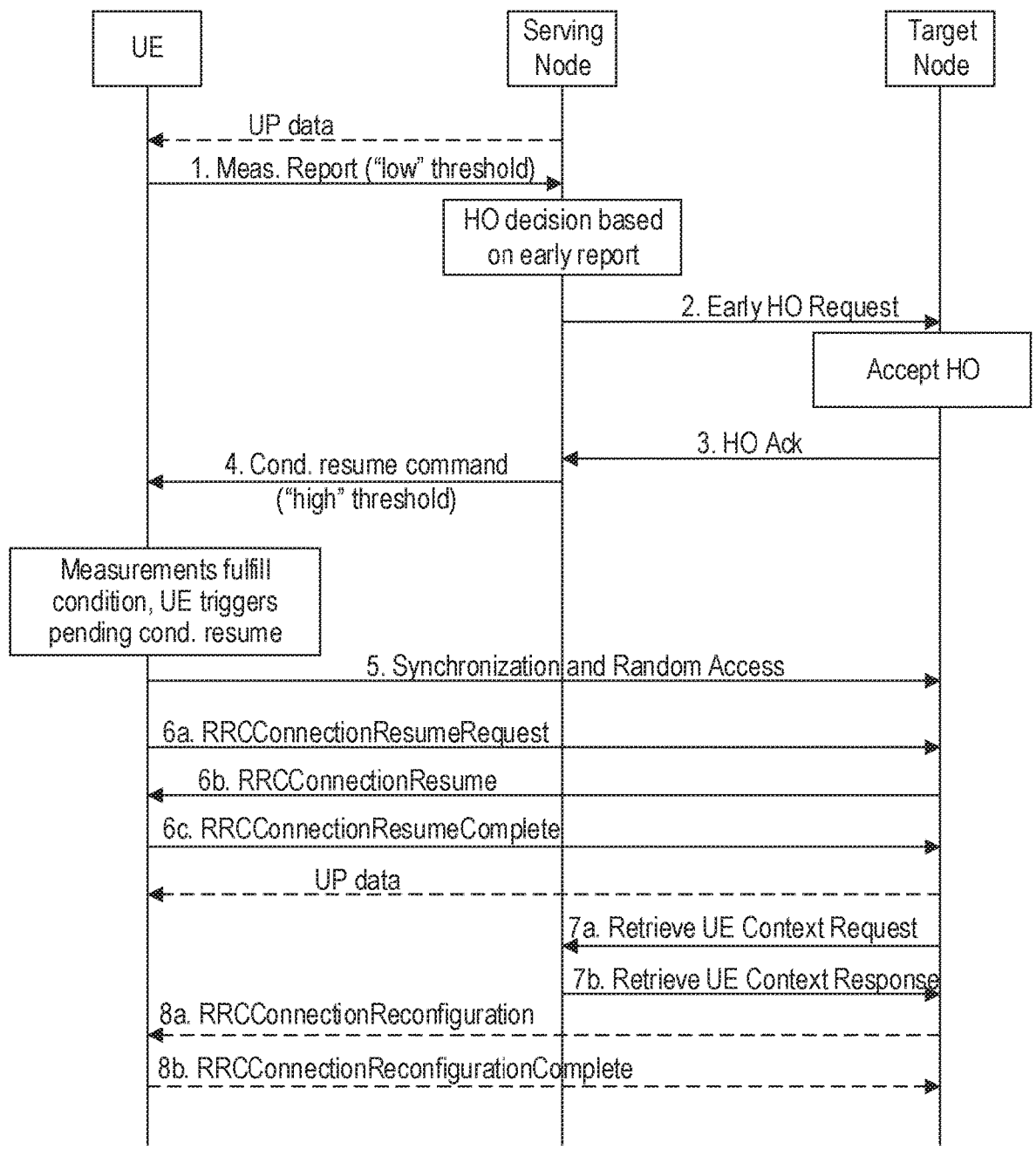
FIG. 7 shows an exemplary signal flow between a UE, a serving node, and a target node for a conditional resume procedure, according to exemplary embodiments of the present disclosure.

FIG. 7 illustrates an exemplary signal flow between a user equipment (UE), a serving network node, and a target network node for a conditional resume procedure, according to exemplary embodiments of the present disclosure. The serving and target network nodes can be, e.g., gNBs and/or components of gNBs, such as CUs and/or DUs.

Conditional resume addresses some of the concerns from conditional handover by not requiring each candidate target cell to be prepared. The UE is provided with a UE context identifier (e.g., I-RNTI allocated by source node) that it can send to a target node (e.g., via RRCResumeRequest for NR, RRCConnectionResumeRequest for LTE) whose cell fulfills the conditional resume threshold "X".

On the other hand, conditional resume involves a longer delay until the UE is fully operational for data transmission/reception. This delay is due to the resume messaging in operation 6 of FIG. 7 (i.e., operations 6a-6c) as well as the context fetching in operation 7 of FIG. 7, both of which are prerequisites to UE UL data transmission. Due to these messages, conditional resume can require more signaling than conditional HO, at least for the case where one or a very small number of cells are configured for conditional HO. Even so, as the number of candidate target cells and/or the number of updates to conditional HO configuration grows, the inter-node signaling for conditional HO can be much greater than for conditional resume.

Exemplary embodiments of the present disclosure provide specific improvements to address these and other problems. Various embodiments include techniques for configuring a UE not only with a conditional mobility condition (e.g., a threshold, X) but also a selection rule for selecting between different conditional mobility operations (e.g., conditional HO or conditional resume) upon the triggering of the conditional mobility condition in a particular target cell (e.g., by UE measurements of at least the target cell). Upon receiving such information, a UE can monitor for the conditional mobility triggering condition (e.g., by performing measurements) and, when the triggering condition occurs for a particular target cell, perform either conditional HO or conditional resume towards the target cell according to the relevant selection rule.

These exemplary embodiments can provide various improvements, benefits, and/or advantages. For example, these embodiments provide flexibility at the UE to choose between conditional HO (where advance context fetching and target candidate preparation is required but with potential to improve latency when UE accesses a target cell) or conditional resume (where advance context fetching during target preparation is NOT required, which makes inter-node signaling easier). In addition, these embodiments provide flexibility in the network to implement, for each UE, a tradeoff between lower complexities at the source node when configuring conditional resume (at the expense of longer latency for access and more signaling during execution) versus reduced signaling over the air for conditional HO due to advance preparation of target candidates (at the expense of more inter-node signaling during preparation, especially when multiple nodes are being prepared).

Due to this flexibility, a network may choose to prepare a limited set of target nodes as candidates, while still minimizing inter-node signaling and avoiding excessively large HO command messages (e.g., RRCReconfiguration including reconfigurationWithSync for NR, RRCConnectionReconfiguration including mobilityControlInfo for LTE). For instance, a source node can configure cells associated with the same node for conditional HO (thereby reducing inter-node signaling) but can configure conditional resume for cells from other nodes. In this manner, the conditional mobility performance can be improved while maintaining a balance between signaling load and latency. Other technical advantages may be readily apparent upon reading the following description.

In general, the term "conditional mobility" is used herein to refer to procedures such as conditional HO, conditional resume, conditional reconfiguration with sync, and/or conditional reconfiguration. A conditional mobility procedure includes a condition, associated with a measurement event, that if triggered causes a UE to perform the corresponding mobility procedure, e.g., resume, HO, reconfiguration with sync, beam switching, reestablishment, beam recovery, etc.

Unless specifically noted, the exemplary embodiments described herein apply to conditional mobility configurations associated with a single cell or with multiple cells. In the case of single cell, a single measurement configuration reference can be provided and associated with a mobility procedure. In the case of multiple cells, a single measurement configuration reference can be provided and associated with the monitoring of multiple cells, e.g., within the same measurement object/frequency. Alternately, multiple measurement configuration references can be provided, one for each target cell.

For the cells to be monitored for conditional HO, the UE may be configured with an RRCReconfiguration with reconfigurationWithSync (for NR) or with an RRCConnectionReconfiguration with mobilityControlInfo (for LTE), e.g., associated with a cell to be accessed when the condition is triggered.

For the cells to be monitored for conditional resume, the UE may be configured with at least one identifier (e.g., I-RNTI for NR, Resume ID for LTE, or another UE identifier) to be included in the RRCResumeRequest (for NR) or RRCConnectionResumeRequest (for LTE) (or similar message). Alternatively, this could be a source C-RNTI+PCI, like in a reestablishment request. For NR, the source node may provide a short or long I-RNTI, for each target cell, depending on the requirements of each target cell.

The UE can also be configured with an RRCReconfiguration with reconfigurationWithSync (for NR) or RRCConnectionReconfiguration with mobilityControlInfo (for LTE) containing some information of the target cells but not a full configuration, together with a UE identifier (e.g., I-RNTI or Resume ID, as discussed above). The target cell information may include information normally transmitted (e.g., broadcast) by the target cell in system information (SI), e.g., RACH configuration to facilitate faster access in the target cell. This information can also be included in a part of the reconfiguration message other than the elements reconfigurationWithSync or mobilityControlInfo.

In general, the term "conditional resume" is used herein to refer to a procedure that includes a condition, associated with a measurement event, that if triggered causes a UE to perform the corresponding resume-like procedure in which the UE transmits a request (e.g., RRCResumeRequest message) containing a UE access-stratum (AS) context identifier allocated by the serving/source node (e.g., an I-RNTI, a source C-RNTI+source PCI identifier) and a security token (e.g., short MAC-I/resume MAC-I). This can also include a reestablishment procedure (e.g., a radio link reestablishment procedure) in which the UE transmits a request (e.g., RRCReestablishmentRequest message) that includes such contents.

In general, the UE and network actions are described herein as being performed in a single RAT, e.g., NR or LTE. For example, the configuration of a conditional HO received in NR is executed in NR while the configuration of a conditional HO received in LTE is executed in LTE. However, the method is also applicable in at least the other following cases:

UE is configured with a conditional HO in NR, but the condition is triggered in LTE and the UE executes the HO or resume in LTE;

UE is configured with a conditional HO in LTE, but the condition is triggered in NR and the UE executes the HO or resume in NR;

More generally, the UE is configured with a conditional HO in RAT-1, but the condition is triggered in RAT-2 and the UE executes the HO or resume in RAT-2.

In general, the UE and network actions are described herein in terms of handover or reconfigurations with sync, which may include the change of a cell. However, similar techniques can be applied when a cell is added or changed during multi-connectivity scenarios such as carrier aggregation (CA), single-RAT dual connectivity (DC), multi-RAT DC, etc. For CA and DC, a Master Cell Group (MCG) is a group of serving cells associated with a master node (MN, e.g., eNB or gNB) and includes a primary cell (PCell) and optionally one or more secondary cells (SCells). Similarly, a Secondary Cell Group (SCG) is a group of serving cells associated with a secondary node (SN, e.g., SeNB or SgNB) and includes a Primary SCell (PSCell) and optionally one or more SCells. In such configurations, the conditional mobility operation can be a conditional SCG addition, PSCell addition, PSCell change, etc. In addition, similar techniques can also be applied to intra-cell conditional mobility procedures, e.g., a reconfiguration with sync with identical target cell and serving cell.

Although the conditional mobility condition (also referred to as "triggering condition") is described generally herein in terms of cells, the triggering condition can also be related to any of the following:

A particular target cell (e.g., cell-X);
A list of candidate target cells (e.g., cell-X1, cell-X2, cell-Xn);
A measurement object;
A frequency;
One or more frequencies, e.g., with associated priorities;
A beam and/or a beam-related entity, such as a reference signal (e.g., SSB, CSI-RS) transmitted in a beam;
A list of beams.

Put differently, any of the above-mentioned configurations may be considered as target entities for the mobility execution and monitoring entities.

As a more concrete example, a UE may be configured to monitor the radio conditions of a candidate target cell-X and, once these are fulfilled according to the triggering condition (e.g., cell-X is X dB better than the UE's PCell in terms of RSRP measurements, similar to an A3 event), the UE executes the conditional mobility procedure (e.g., resume or handover) based on the selection rule.

In one embodiment, the UE may be configured by a network node with different types of conditions, each associated with a particular conditional mobility procedure. For example, a UE may be configured with conditional handover configuration(s) and conditional resume configuration(s), or with at least one of these configurations. As such, in this context, type of condition refers to the type of mobility procedure that the UE shall execute upon the fulfillment of the condition.

In some embodiments, the UE can also be provided with type-specific configurations associated with each mobility procedure. For example, when configured for conditional HO the UE can be given a configuration to be used in a candidate target cell (e.g., an RRCReconfiguration message to access a given candidate target cell). As another example, when configured for conditional resume, the UE can be configured with an AS Context identifier (e.g., an I-RNTI or a source C-RNTI+source physical cell identifier). In such embodiments, the UE's selection of the method to be used can be determined implicitly from the type of information provided with the configuration.

In some embodiments, the configuration provided to the UE can also include which cell, list of cells, measurement objects, and/or frequencies should be monitored for the triggering condition(s), as well as the node to be accessed depending on the execution method.

As one example, the UE may be configured with a first candidate target cell (e.g., cell-X) and a first triggering condition for conditional HO, as well as a configuration to access candidate target cell-X (e.g., RRCReconfiguration message prepared by a target node associated with cell-X). Additionally, the UE can be configured with a second candidate target cell (e.g., cell-X') and a second triggering condition for conditional resume, as well as a configuration to access cell-X' and to facilitate location of the UE AS context in the source/serving node (e.g., an AS context identifier like an I-RNTI or source C-RNTI+source PCI). Based on these configurations, the UE monitors the first condition in cell-X and the second condition in cell-X'. If the first condition is fulfilled, the UE triggers HO towards cell-X; if the second condition is fulfilled the UE triggers resume towards cell-X'. In this example, the triggering cell provided in the configuration determines the mobility method selected by the UE upon fulfillment of the condition.

As another example, the UE may be configured with a first list of cells (cell-X1, . . . , cell-Xn) and a first set of conditions for conditional HO, as well as a second list of cells (cell-X1', . . . , cell-Xn') and a second set of conditions for conditional resume. Based on these configurations, the UE monitors the conditions of the first set in cells of the first list and the conditions of the second set in cells of the second list. If one of the first set of conditions is fulfilled in a cell of the first list, the UE triggers conditional HO towards the cell that fulfills the condition.

As another example, the UE may be configured with a first cell (e.g., cell-X) from a measurement object A along with an associated first condition for conditional HO. The UE may also be configured with a second cell (e.g., cell-X') from a measurement object B along with an associated second condition for conditional resume. Based on these configurations, the UE monitor the respective conditions in the respective cells. If the first condition is fulfilled, the UE performs handover towards a cell in measurement object A; if the second condition is fulfilled, the UE performs resume towards a cell in measurement object B.

As another example, the UE may be configured with a first cell (e.g., cell-X) having a frequency A along with an associated first condition for conditional HO. The UE may also be configured with a second cell (e.g., cell-X') having a frequency B along with an associated second condition for conditional resume. Based on these configurations the UE monitors the respective conditions in the respective cells. If the first condition is fulfilled, the UE triggers conditional handover towards the first cell having frequency A; if the second condition is fulfilled the UE triggers resume towards the second cell having frequency B.

As another example, the UE may be configured with a first list of cells (e.g., cell-X1, cell-Xn) having a frequency A along with an associated first set of conditions for conditional HO. The UE may also be configured with a second list of cells (e.g., cell-X1', cell-Xn') having a frequency B along with an associated second set of conditions conditional resume. Based on these configurations the UE monitors the respective conditions in the respective cells. If the first condition is fulfilled for one of the cells in the first list, the UE triggers conditional handover towards that cell; if the second condition is fulfilled for one of the cells in the second list, the UE triggers resume towards that cell.

As another example, the UE may be configured with a first list of cells (e.g., cell-X1, cell-Xn) and a first set of conditions for conditional handover associated with these respective cells, and a second condition for conditional resume to be applied to any cell other than those on the first list.

As another example, the UE may be configured with one or more frequencies for conditional resume. For example, the condition can be an A2 type of event in which the serving cell becomes X dB worse than a threshold. When the condition is triggered, the UE searches the configured frequencies and selects the best cell (e.g., highest signal strength) subject to some minimum (e.g., signal strength above a threshold). If the frequencies are configured with an associated priority, the UE evaluates the frequencies in order of priority and select within each frequency the best cell that meets the minimum criterion. If no such cell is found on a carrier, the UE moves to the next carrier, and so on.

In any of the above examples, certain configurations can also include one or more validity timer(s). As one alternative, there could be one validity timer for the entire configuration. As another alternative, there could be one validity timer for the configuration for conditional handover and one validity timer for the configuration of conditional resume. As yet another alternative, there could be one validity timer for the configuration associated with each cell.

In any of the above examples, the same candidate target cell may be linked to multiple triggering conditions, each linked to a particular mobility procedure. For example, one candidate target cell can be associated with a first condition that, if fulfilled, causes the UE to perform conditional HO towards the candidate target cell. The same candidate target cell can be associated with a second condition that, if fulfilled, causes the UE to perform conditional resume towards the same candidate target cell. In that variant, it is not the candidate target cell candidate that really determines the mobility method to be selected, but rather the condition that is fulfilled first. Multiple triggering conditions in this context may be:

- Different intra-RAT events (e.g., A3 and A1, A2 and A4, or in general, Ax and Ay);
- Different inter-RAT events (e.g., B1 and B2, Bx and By, etc.);
- Different events, mixing inter- and intra-RAT (e.g., B1 and A1, Bx and Ay, etc.);
- There could be different configurations for the same event (e.g., A3), where one could be based on RSRP trigger while the other on RSRQ trigger.

One could see the previous example as a result of a configuration that determines specifically which mobility procedure shall be executed depending on the explicit configuration provided to the UE. In these different examples above and other variants described herein, the UE only executes one of the mobility procedures for a particular candidate target cell. As such, the UE can discard configurations associated with the non-selected mobility procedure and/or non-selected candidate cells. For example, if the UE selects a conditional resume procedure for a candidate target cell, the UE can discard a conditional HO configuration for the same candidate target cell, as well as other resume configurations for non-selected candidate target cells.

In some embodiments, the network can provide the configuration to the UE in a new RRC message, referred to herein as RRCConditionalReconfiguration. FIG. 8 shows an ASN.1 data structure that defines a specific example of an RRCConditionalReconfiguration message. In this example, the message includes a list (condReconfigurationList) of CondReconfiguration information elements (IEs), each of which includes a configuration for conditional HO (condHandover) or conditional resume (condResume). Each of these configurations includes an event trigger as well as information to be used when performing HO or resume, as the case may be. The candidate target cell ID is provided explicitly for conditional resume, but is included in the RRCReconfiguration provided for conditional HO. Frequency information can be provided in a similar manner Note that in this message structure, the network can configure the same cell in two different elements in the list, but with different conditions for triggering HO and resume.

FIG. 9 shows another ASN.1 data structure that defines a different example of an RRCConditionalReconfiguration message. Similar to FIG. 8, this example also includes condReconfigurationList of CondReconfiguration IEs, each of which includes a configuration for conditional HO (condHandover) or conditional resume (condResume). However, the configuration also includes a condResumeList that contains an explicit list of candidate target cells configured for conditional resume, as well as a single I-RNTI (or any other resume identifier) and a single trigger condition to be used for each of these cells.

Various embodiments of the rules and/or criteria for selecting between conditional mobility procedures for a particular candidate target cell are also envisioned (referred to as "selection rules"). These embodiments can be based on the occurrence of different events while the UE is monitoring for the triggering conditions (e.g., by performing cell measurements), including the following:

If cell-X fulfills a conditional mobility trigger condition AND the UE has a configuration prepared by cell-X (e.g., RRCReconfiguration with a reconfigurationWithSync for NR, RRCConnectionReconfiguration with mobilityControlInfo for LTE), the UE performs a HO towards cell-X and applies the message prepared by cell-X. This includes performing synchronization and random access towards cell-X and transmitting an appropriate message (e.g., RRCReconfigurationComplete or RRCConnectionReconfigurationComplete) to cell-X. The UE assumes that cell-X is prepared to receive it, such that the UE may use the C-RNTI allocated by the target node associated with candidate cell-X, calculate new security keys, etc.

Else, if cell-X fulfills the conditional mobility trigger condition, the UE does not have a configuration prepared by cell-X, AND the UE has a resume-like identifier (e.g., I-RNTI), the UE performs a resume towards cell-X. This includes performing synchronization and random access towards cell-X and transmitting an appropriate message (e.g., RRCResumeRequest for NR, RRCConnectionResumeRequest for LTE) to cell-X. However, the UE does not have to assume that cell-X is prepared to receive the incoming UE.

Else, if cell-X fulfills the conditional mobility trigger condition, the UE does not have a configuration prepared by cell-X, AND the UE does not have a resume-like identifier (e.g., I-RNTI), the UE performs a reestablishment procedure towards cell-X. This includes performing synchronization and random access towards after cell selection and the initiation of a reestablishment procedure.

Else, if cell-X fulfills the conditional mobility trigger condition AND the UE has stored a partial configuration prepared by cell-X and a resume-like UE identifier associated with cell-X, the UE performs a resume procedure towards cell-X. This includes performing synchronization and random access towards cell-X and transmitting an appropriate message (e.g., RRCResumeRequest for NR, RRCConnectionResumeRequest for LTE) to cell-X. As in the other cases, the UE does not have to assume that cell-X is prepared to receive the incoming UE.

FIG. 10 shows another ASN.1 data structure that defines a different example of an RRCConditionalReconfiguration message. Similar to FIG. 8, this example also includes condReconfigurationList of CondReconfiguration IEs, each of which includes a configuration for conditional HO (condHandover) or conditional resume (condResume). However, the configuration also includes a common trigger condition (eventTriggerCHO) and a common I-RNTI (resumeIdentity). Furthermore, each cell configured for HO includes an associated validity Timer value. After receiving such a configuration, the UE can monitor for the trigger condition in these cells (each of which is identified in the associated rrcReconfigurationToApply field) until the validityTimer expires, after which the UE can cease this monitoring and discard the related configurations for these cells.

For example, if the validityTimer associated with a particular conditional mobility procedure (e.g., with all conditional HO configurations) expires, then the UE discards the conditional mobility configurations of the type for which the validity timer expires. If a single overall validityTimer is associated with the entire conditional mobility configuration, then the UE discards the entire conditional mobility configuration. On the other hand, if a single validityTimer that is associated with all conditional HO procedures expires, the UE may discard all conditional HO configurations, but retain the conditional resume configurations and/or reconfigure itself to use conditional resume also in the cells for which conditional HO was configured but discarded (e.g., due to expired validityTimer).

Note that the exemplary ASN.1 data structures shown in FIGS. 8-10 are intended to illustrate certain principles of the respective embodiments but are not intended to be comprehensive and/or complete. In other words, such data structures can include other features and/or IEs without departing from the scope of the respective embodiments.

In some embodiments, the UE can be configured with a list of cells for conditional HO in a certain frequency, e.g., associated with a configured measurement object, along with a triggering condition. The UE then monitors for the triggering condition not only for the configured cells, but for all cells in the associated measurement object. If a cell in the list triggers the condition, the UE performs a HO, but if another cell from that measurement object triggers the condition, the UE performs a resume procedure. Alternately, instead of performing a resume procedure, the UE can perform a re-establishment procedure.

In other embodiments, the UE can be configured for conditional HO with respect to one or more frequencies, along with a triggering condition. In case the triggering condition is fulfilled for the source cell instead of one of the candidate target cell (e.g., A2 type of event where source worse than threshold), the UE can perform a resume procedure on the best cell within the given frequencies with respect to a particular criterion (e.g., signal strength). If priorities are provided, the UE can evaluate the criterion on the various frequencies in order of priority, and within each frequency it tries to resume on the best cell. It may be that no cell is found on a particular frequency (e.g., due to it being too weak), and in this case the UE will continue to search on the remaining frequencies.

Although the above examples have been given in terms of selecting between a HO and a resume procedure, the selection can also be made between two different mobility procedures, or among more than two mobility procedures, according to one or more selection rules. For example, various rules can be applied for selecting between HO and re-establishment procedures, or among HO, resume, and re-establishment.

For example, when a configured trigger condition is fulfilled for cell-X, the UE selects between a HO, a resume procedure, or a reestablishment procedure based on whether the cell that triggered the conditional mobility is included in a configured list of cells for which conditional HO should be performed, or is included in a configured list of cells for which conditional resume should be performed, or is not included in any configured list of cells at all. As another example, if a failure is declared while the UE is monitoring at least one trigger condition associated with HO, the UE performs a re-establishment procedure.

In some embodiments, multiple triggering conditions can be triggered simultaneously, e.g., during the same measurement. If triggering condition for multiple cells are fulfilled simultaneously, there may be several strategies the UE can follow. These can be seen as specification or implementation alternatives, but it is also possible to standardize multiple strategies, and make the strategy to use part of the configuration the UE is provided with. Exemplary embodiments include the following strategies for handling multiple triggering conditions being fulfilled simultaneously:

The UE prioritizes a cell for which conditional HO is configured over a cell for which conditional resume is configured.

Among the triggering cells for which conditional HO is configured, or alternatively, among all the triggered cells (regardless of associated conditional mobility procedure), the UE selects the cell for which the triggering condition(s) (e.g., threshold) is/are exceeded the most.

Among the triggering cells for which conditional HO is configured, or alternatively, among all the triggered cells (regardless of associated conditional mobility procedure), the UE selects the cell with the highest quality, e.g., in terms of RSRP, RSRQ, SINR, SNR or any combination thereof.

The above strategies can also be combined. For example, the UE can prioritize a cell for which conditional HO is configured over a cell for which conditional resume is configured, unless the cell triggering conditional resume exceeds its associated trigger condition (e.g., second threshold) by a greater amount than the cell triggering conditional HO exceeds its associated trigger condition (e.g., first threshold). The "greater amount" can also be subject to a threshold or offset, such that if the first threshold is exceeded by Z dB, the second threshold must be exceeded by Z+offset dB in order to prioritize the resume operation.

Even if such offset-based prioritization techniques indicate that the UE should select conditional resume, the UE may still select a cell triggering conditional HO (thereby avoiding delays of conditional resume) if the UE has pending delay sensitive UL data to transmit.

In some embodiments, if all conditional mobility configurations expire (e.g., validity timer(s)) and the UE is no longer in contact with its serving cell, the UE attempts reestablishment by sending an RRCReesblishmentRequest (for NR) or RRCConnectionReestablishmentRequest (for LTE) message to a detected cell. Alternately, the UE can go to RRC_IDLE state and reinitiates RRC connection establishment.

As a specific example of such embodiments, a specific conditional HO configuration for a candidate target cell (e.g., cell-X) may have a validity timer and an RRCReconfiguration for cell-X, as well as a source AS Context identifier (e.g., at least one I-RNTI) for conditional resume towards cell-X. If the triggering condition is fulfilled while the timer is still running, the UE performs conditional HO. But upon the expiry of the validity timer, the UE discards the conditional HO configuration but continues monitoring the triggering condition and performs resume towards cell-X if the triggering condition is met. Similar techniques can be applied to selecting HO or re-establishment based on a triggering condition occurring before/after the expiry of a validity timer.

Although the above embodiments have been described in terms of UE operations, other embodiments can involve complementary operations performed by a network node (e.g., a source or serving node for a particular UE). In some embodiments, a source node can decide which cells/frequencies (or any other entities described herein) are configured for conditional mobility operations with respect to the UE. For example, the source node may decide to configure conditional HO for cells from the same node so that it does not require any preparation signaling over inter-node interfaces, but also configure the UE with a list of candidate cells from other nodes for conditional resume, so that context fetching may be applied if the cell triggering the condition is from a non-prepared node. The source node may also omit the list of cells for which the UE is configured to perform conditional resume, from which the UE can infer that it if a triggering condition is met in any cell for which there is no configuration for conditional HO, the UE should perform resume in that cell.

In some embodiments, when the source node configures a UE for conditional HO towards a particular inter-node (e.g., inter-gNB or inter-eNB) candidate target cell, the source node sends the relevant portion of the UE context to the target node associated with the candidate target cell. The UE conditional HO configuration also includes reconfiguration information (e.g., including reconfigurationWithSync or mobilityControlInfo) from the candidate target node to be applied in the candidate target cell upon a triggering condition. Subsequently, the source node reconfigures the UE to use conditional resume instead of conditional HO for the candidate target cell. The source node then transfers the updated UE context to the target node associated with the candidate target cell, but without forwarding any reconfiguration information from the target node to the UE. The UE and the target node are now prepared for an optimized conditional resume procedure, where the target node does not have to request the UE context from the source node.

In some embodiments, the source node includes one or more validity timers in the conditional mobility configuration(s) that it provides the UE (e.g., as illustrated in FIG. 10). If one of these validity timers expires, and the source node still can contact the UE, the source node may either choose to reconfigure the UE with new and/or complementary conditional mobility configuration(s), or choose to let the UE rely on the remaining valid (i.e., non-expired) conditional mobility configurations. If the validity timer(s) for all the UE's conditional mobility configurations have expired and the source node can still contact the UE, the source node may choose to configure the UE with new conditional mobility configuration(s) or revert to using non-conditional HO.

In some embodiments, the source node decides to configure conditional HO for cell(s) in the same node where the source cell is and conditional resume or reestablishment for cells in neighbor nodes. In this manner, the source node can reduce the need for inter-node signaling during the preparation phase. The only inter-node signaling (i.e., context fetching) occurs after the UE fulfills the triggering condition in a candidate cell associated with a different node and performs a resume procedure towards that candidate cell. In various embodiments, the source node can identify cells as being "in the same node" based on being in the same distributed unit (DU) as the source cell or, alternately, based on being in the same central unit (CU) but possibly in different DU(s).

These embodiments described above can be further illustrated with reference to FIGS. 11-12, which depict exemplary methods and/or procedures performed by a UE and a network node, respectively. In other words, various features of the operations described below, with reference to FIGS. 11-12, correspond to various embodiments described above.

Figure 11:
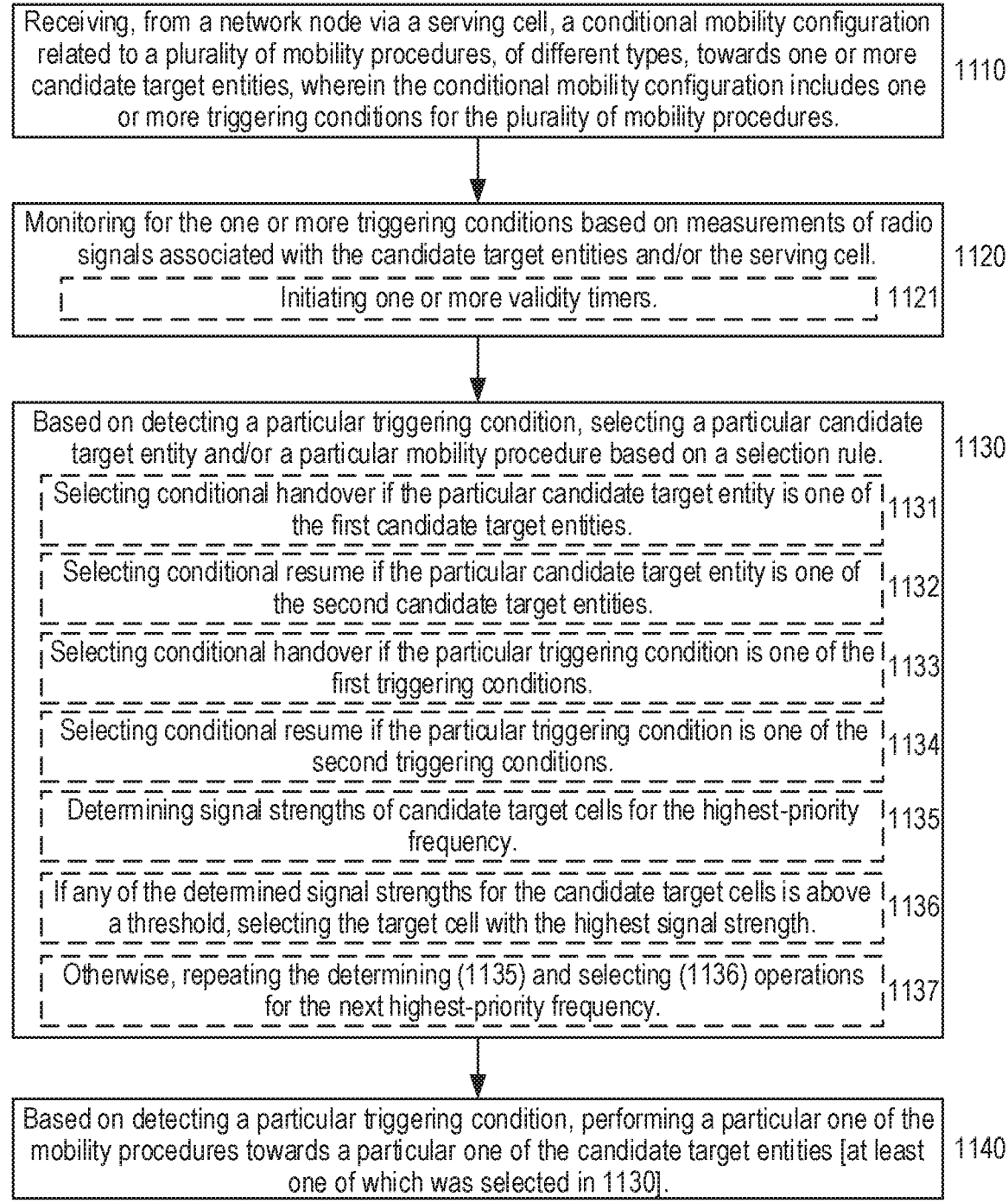
FIG. 11 is a flow diagram illustrating exemplary methods (e.g., procedures) performed by a user equipment (UE, e.g., wireless device, IoT device, MTC device, etc. or component thereof), according to various exemplary embodiments of the present disclosure

In particular, FIG. 11 is a flow diagram illustrating an exemplary conditional mobility method performed by a user equipment (UE) in a wireless network, according to various exemplary embodiments of the present disclosure. For example, the exemplary method shown in FIG. 11 can be performed by a UE (e.g., wireless device, IoT device, MTC device, etc. or component thereof) such as described in relation to other figures herein. Furthermore, the exemplary method shown in FIG. 11 can be utilized cooperatively with other exemplary methods described herein (e.g., FIG. 12) to provide various exemplary benefits described herein. Although FIG. 11 shows specific blocks in a particular order, the operations of the exemplary method can be performed in a different order than shown and can be combined and/or divided into blocks having different functionality than shown. Optional operations are indicated by dashed lines.

The exemplary method illustrated in FIG. 11 can include the operations of block 1110, in which the UE can receive, from a network node via a serving cell, a conditional mobility configuration related to a plurality of mobility procedures towards one or more candidate target entities. The plurality of mobility procedures can be of different types. In some embodiments, the plurality of mobility procedures can include at least two of the following: conditional handover, conditional resume, conditional re-establishment, conditional primary secondary cell (PSCell) addition, and conditional PSCell change. The conditional mobility configuration can also include one or more triggering conditions for the plurality of mobility procedures.

The exemplary method can also include the operations of block 1120, in which the UE can monitor for the one or more triggering conditions based on measurements of radio signals associated with the candidate target entities and/or the serving cell.

The exemplary method can also include the operations of blocks 1130-1140, which are based on (e.g., performed in response to) detecting a particular triggering condition, e.g., while monitoring in block 1120. In block 1140, the UE can perform a particular one of the mobility procedures towards a particular one of the candidate target entities. In block 1130, the UE can select the particular candidate target entity and/or the particular mobility procedure (e.g., performed in block 1140) based on a selection rule. In other words, the outcome of block 1130 can be an input to the operations of block 1140. However, it is not necessary that the UE selects both the particular candidate target entity and the particular mobility procedure used in block 1140 based on the selection rule; in some embodiments, the UE can determine one of these based on one or more different rules, criteria, configurations, etc.

In various embodiments, the candidate target entities can include any of the following: one or more cells, other than the serving cell; one or more frequencies; one or more beams; and one or more reference signals (RS) associated with respective beams. In some embodiments, the candidate target entities include a plurality of candidate target cells, and the particular triggering condition is that a signal strength of the serving cell is a predetermined amount below a signal strength of a particular candidate target cell.

In some embodiments, the conditional mobility configuration can include one or more first configurations, for conditional handover, corresponding to respective one or more first candidate target entities; and one or more second configurations, for conditional resume, corresponding to respective one or more second candidate target entities. For example, the first candidate target entities can include one or more first cells served by the network node, while the second candidate target entities can include more second cells served by other network nodes. As another example, the first candidate target entities can include one or more first cells associated with a first measurement object, while the second candidate target entities include one or more second cells associated with a second measurement object (i.e., different from the first measurement object in some manner).

Furthermore, in such embodiments, each first configuration can include an RRCReconfiguration message prepared by a target node associated with the corresponding first candidate target entity. Likewise, for each particular second candidate target entity, the second configuration can include an identifier of a UE context (e.g., related to a network node associated with the particular second candidate target entity). In such embodiments, selecting the particular mobility procedure based on the selection rule (e.g., in block 1130) can include the operations of sub-blocks 1131-1132. In sub-block 1131, the UE can select conditional handover if the particular candidate target entity is one of the first candidate target entities, while in sub-block 1132, the UE can select conditional resume if the particular candidate target entity is one of the second candidate target entities.

In some embodiments, each first configuration can include one or more first triggering conditions, and each second configuration can include one or more second triggering conditions. In such embodiments, selecting the particular mobility procedure based on the selection rule (e.g., in block 1130) can include the operations of sub-blocks 1133-1134. In sub-block 1133, the UE can select conditional handover if the particular triggering condition is one of the first triggering conditions, while in sub-block 1134, the UE can select conditional resume if the particular triggering condition is one of the second triggering conditions. In some of these embodiments, the first candidate target entities and the second candidate target entities can include a common candidate target entity, and the first and second triggering conditions associated with the common candidate target entity can be different.

In some embodiments, the particular triggering condition can be that a signal strength of the serving cell is a predetermined amount below a threshold. In such embodiments, the candidate target entities can include a plurality of frequencies arranged in order of priority, and a plurality of candidate target cells. Furthermore, in such embodiments, the operations of block 1130 can include the operations of sub-blocks 1135-1137. In sub-block 1135, the UE can determine signal strengths of the candidate target cells for the highest-priority frequency. In sub-block 1136, the UE can select the candidate target cell with the highest signal strength, if any of the determined signal strengths for the candidate target cells is above a threshold. Otherwise (i.e., if none of the determined signal strengths for the candidate target cells is above the threshold), the UE can repeat the operations of sub-blocks 1135-1136 for the next highest-priority frequency.

In some embodiments, the conditional mobility configuration can include one or more validity timers, with each validity timer being associated with one or more of the mobility procedures and/or at least one of the candidate target entities. In such embodiments, the monitoring operations of block 1120 can include the operations of sub-block 1121, where the UE can initiate the validity timers. Furthermore, in such embodiments, selecting based on the selection rule (e.g., in block 1130) can be further based on whether a validity timer associated with the particular mobility procedure and the particular candidate target entity has expired.

Figure 12:
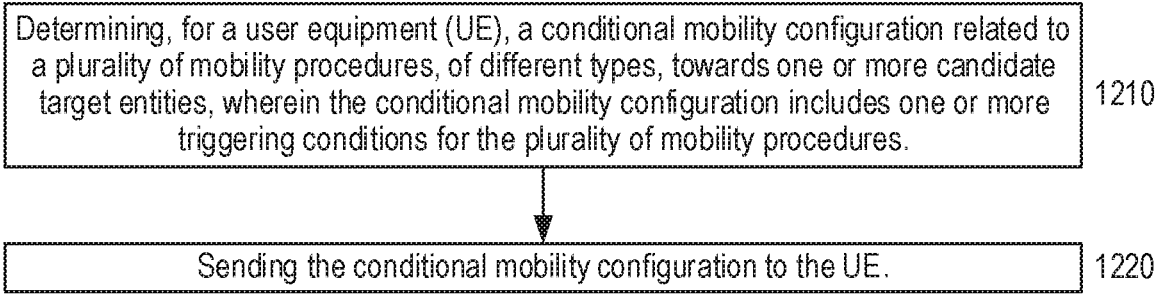
FIG. 12 is a flow diagram illustrating exemplary methods (e.g., procedures) performed by a network node (e.g., base station, eNB, gNB, etc. or components thereof) in a wireless network (e.g., e.g., E-UTRAN, NG-RAN), according to various exemplary embodiments of the present disclosure.

In addition, FIG. 12 is a flow diagram illustrating an exemplary method (e.g., procedure) for configuring a conditional mobility of a user equipment (UE) in a wireless network, according to various exemplary embodiments of the present disclosure. The exemplary method shown in FIG. 12 can be performed, for example, by a network node (e.g., base stations, eNBs, gNBs, etc. or components thereof) in the wireless network (e.g., E-UTRAN, NG-RAN), such as described in relation to other figures herein. Furthermore, the exemplary method shown in FIG. 12 can be used cooperatively with other exemplary methods described herein (e.g., in FIG. 11) to provide various exemplary benefits described herein. Although FIG. 12 shows specific blocks in a particular order, the operations of the exemplary method can be performed in a different order than shown and can be combined and/or divided into blocks having different functionality than shown. Optional operations are indicated by dashed lines.

The exemplary method illustrated in FIG. 12 can include the operations of block 1210, in which the network node can determine, for the UE, a conditional mobility configuration related to a plurality of mobility procedures towards one or more candidate target entities. The plurality of mobility procedures can be of different types. In some embodiments, the plurality of mobility procedures can include at least two of the following: conditional handover, conditional resume, conditional re-establishment, conditional primary secondary cell (PSCell) addition, and conditional PSCell change. The conditional mobility configuration can also include one or more triggering conditions for the plurality of mobility procedures.

The exemplary method can also include the operations of block 1220, in which the network node can send the conditional mobility configuration to the UE via a serving cell.

In various embodiments, the candidate target entities can include any of the following: one or more cells, other than the serving cell; one or more frequencies; one or more beams; and one or more reference signals (RS) associated with respective beams. In some embodiments, the candidate target entities can include a plurality of candidate target cells, and one of the triggering conditions is that a signal strength of the serving cell is a predetermined amount below a signal strength of a particular candidate target cell.

In some embodiments, the conditional mobility configuration can include one or more first configurations, for conditional handover, corresponding to respective one or more first candidate target entities; and one or more second configurations, for conditional resume, corresponding to respective one or more second candidate target entities. For example, the first candidate target entities can include one or more first cells served by the network node, while the second candidate target entities can include more second cells served by other network nodes. As another example, the first candidate target entities can include one or more first cells associated with a first measurement object, while the second candidate target entities include one or more second cells associated with a second measurement object (i.e., different from the first measurement object in some manner).

Furthermore, in such embodiments, each first configuration can include an RRCReconfiguration message prepared by a target node associated with the corresponding first candidate target entity. Likewise, for each particular second candidate target entity, the second configuration can include an identifier of a UE context (e.g., related to a network node associated with the particular second candidate target entity). In some embodiments, the first configuration can include one or more first triggering conditions, and the second configuration can include one or more second triggering conditions. In such embodiments, the first candidate target entities and the second candidate target entities can include a common candidate target entity, and the first and second triggering conditions associated with the common candidate target entity can be different.

In some embodiments, one of the triggering conditions can be that a signal strength of the serving cell is a predetermined amount below a first threshold. In such embodiments, the candidate target entities can include a plurality of frequencies arranged in order of priority, and a plurality of candidate target cells. In some embodiments, the conditional mobility configuration can include one or more validity timers, with each validity timer being associated with one or more of the mobility procedures and/or at least one of the candidate target entities.

Figure 13:
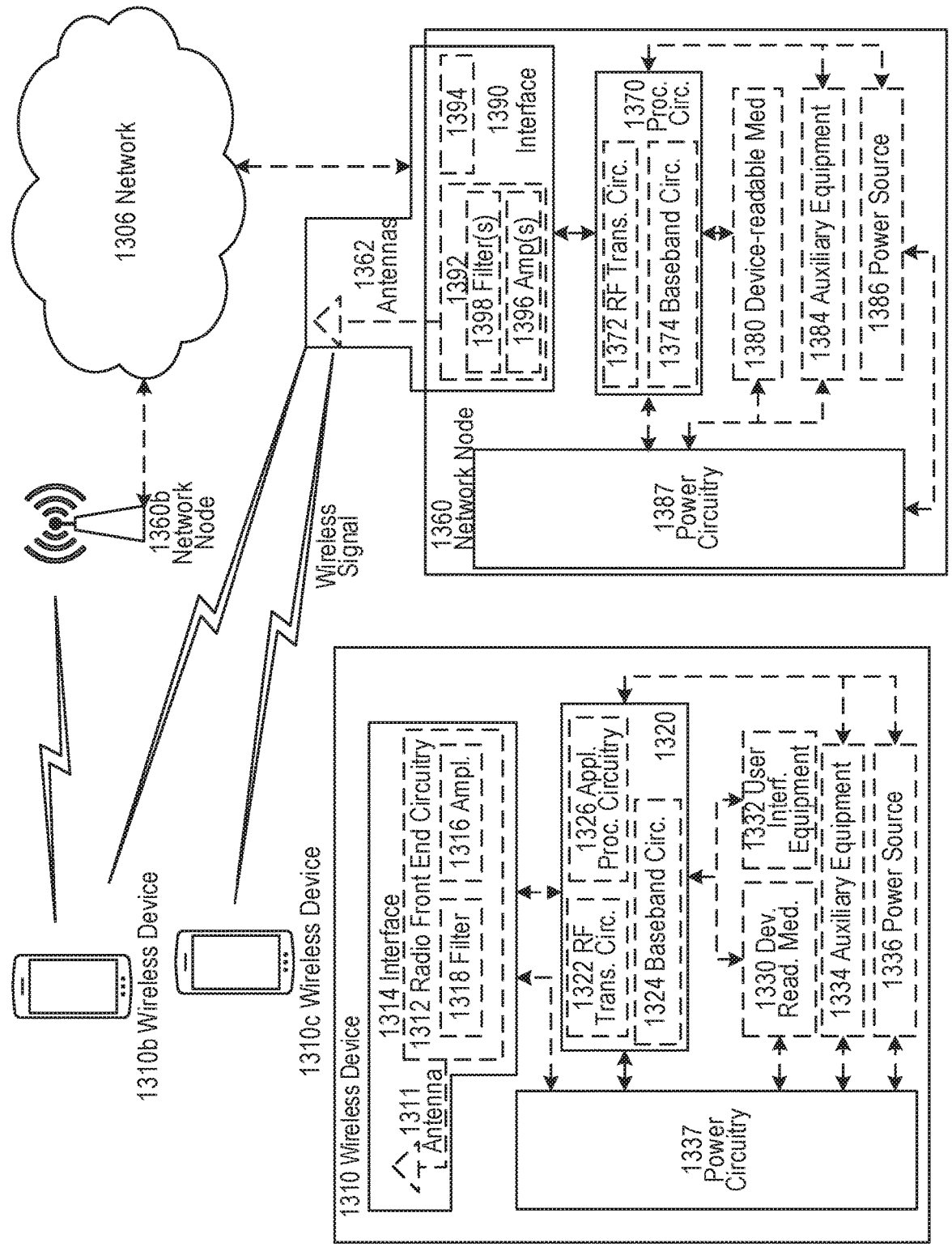
FIG. 13 illustrates an exemplary wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 13. For simplicity, the wireless network of FIG. 13 only depicts network 1306, network nodes 1360 and 1360*b*, and WDs 1310, 1310*b*, and 1310*c*. In practice, a wireless network can further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1360 are depicted as single boxes located within a larger box, or nested within multiple boxes, in practice, a network node can comprise multiple different physical components that make up a single illustrated component (e.g., device readable medium 1380 can comprise multiple separate hard drives as well as multiple RAM modules).

Similarly, network node 1360 can be composed of multiple physically separate components (e.g., a NodeB component and a RNC component, or a BTS component and a BSC component, etc.), which can each have their own respective components. In certain scenarios in which network node 1360 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1360 can be configured to support multiple radio access technologies (RATs). In such embodiments, some components can be duplicated (e.g., separate device readable medium 1380 for the different RATs) and some components can be reused (e.g., the same antenna 1362 can be shared by the RATs). Network node 1360 can also include multiple sets of the various illustrated components for different wireless technologies integrated into network node 1360, such as, for example, GSM, WCDMA, LTE, NR, WiFi, or Bluetooth wireless technologies. These wireless technologies can be integrated into the same or different chip or set of chips and other components within network node 1360.

Processing circuitry 1370 can be configured to perform any determining, calculating, or similar operations (e.g., certain obtaining operations) described herein as being provided by a network node. These operations performed by processing circuitry 1370 can include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 can execute instructions stored in device readable medium 1380 or in memory within processing circuitry 1370. Such functionality can include providing any of the various wireless features, functions, or benefits discussed herein. In some embodiments, processing circuitry 1370 can include a system on a chip (SOC).

In some embodiments, processing circuitry 1370 can include one or more of radio frequency (RF) transceiver circuitry 1372 and baseband processing circuitry 1374. In some embodiments, radio frequency (RF) transceiver circuitry 1372 and baseband processing circuitry 1374 can be on separate chips (or sets of chips), boards, or units, such as radio units and digital units. In alternative embodiments, part or all of RF transceiver circuitry 1372 and baseband processing circuitry 1374 can be on the same chip or set of chips, boards, or units In certain embodiments, some or all of the functionality described herein as being provided by a network node, base station, eNB or other such network device can be performed by processing circuitry 1370 executing instructions stored on device readable medium 1380 or memory within processing circuitry 1370. In alternative embodiments, some or all of the functionality can be provided by processing circuitry 1370 without executing instructions stored on a separate or discrete device readable medium, such as in a hard-wired manner In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360 but are enjoyed by network node 1360 as a whole, and/or by end users and the wireless network generally.

Device readable medium 1380 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1370. Device readable medium 1380 can store any suitable instructions, data or information, including a computer program, software, an application including one or more of logic, rules, code, tables, etc. and/or other instructions capable of being executed by processing circuitry 1370 and, utilized by network node 1360. Device readable medium 1380 can be used to store any calculations made by processing circuitry 1370 and/or any data received via interface 1390. In some embodiments, processing circuitry 1370 and device readable medium 1380 can be considered to be integrated.

Interface 1390 is used in the wired or wireless communication of signaling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that can be coupled to, or in certain embodiments a part of, antenna 1362. Radio front end circuitry 1392 comprises filters 1398 and amplifiers 1396. Radio front end circuitry 1392 can be connected to antenna 1362 and processing circuitry 1370. Radio front end circuitry can be configured to condition signals communicated between antenna 1362 and processing circuitry 1370. Radio front end circuitry 1392 can receive digital data that is to be sent out to other network nodes or WDs via a wireless connection. Radio front end circuitry 1392 can convert the digital data into a radio signal having the appropriate channel and bandwidth parameters using a combination of filters 1398 and/or amplifiers 1396. The radio signal can then be transmitted via antenna 1362. Similarly, when receiving data, antenna 1362 can collect radio signals which are then converted into digital data by radio front end circuitry 1392. The digital data can be passed to processing circuitry 1370. In other embodiments, the interface can comprise different components and/or different combinations of components.

In certain alternative embodiments, network node 1360 may not include separate radio front end circuitry 1392, instead, processing circuitry 1370 can comprise radio front end circuitry and can be connected to antenna 1362 without separate radio front end circuitry 1392. Similarly, in some embodiments, all or some of RF transceiver circuitry 1372 can be considered a part of interface 1390. In still other embodiments, interface 1390 can include one or more ports or terminals 1394, radio front end circuitry 1392, and RF transceiver circuitry 1372, as part of a radio unit (not shown), and interface 1390 can communicate with baseband processing circuitry 1374, which is part of a digital unit (not shown).

Antenna 1362 can include one or more antennas, or antenna arrays, configured to send and/or receive wireless signals. Antenna 1362 can be coupled to radio front end circuitry 1390 and can be any type of antenna capable of transmitting and receiving data and/or signals wirelessly. In some embodiments, antenna 1362 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1362 can be separate from network node 1360 and can be connectable to network node 1360 through an interface or port.

Antenna 1362, interface 1390, and/or processing circuitry 1370 can be configured to perform any receiving operations and/or certain obtaining operations described herein as being performed by a network node. Any information, data and/or signals can be received from a wireless device, another network node and/or any other network equipment. Similarly, antenna 1362, interface 1390, and/or processing circuitry 1370 can be configured to perform any transmitting operations described herein as being performed by a network node. Any information, data and/or signals can be transmitted to a wireless device, another network node and/or any other network equipment.

Power circuitry 1387 can comprise, or be coupled to, power management circuitry and can be configured to supply the components of network node 1360 with power for performing the functionality described herein. Power circuitry 1387 can receive power from power source 1386. Power source 1386 and/or power circuitry 1387 can be configured to provide power to the various components of network node 1360 in a form suitable for the respective components (e.g., at a voltage and current level needed for each respective component). Power source 1386 can either be included in, or external to, power circuitry 1387 and/or network node 1360. For example, network node 1360 can be connectable to an external power source (e.g., an electricity outlet) via an input circuitry or interface such as an electrical cable, whereby the external power source supplies power to power circuitry 1387. As a further example, power source 1386 can comprise a source of power in the form of a battery or battery pack which is connected to, or integrated in, power circuitry 1387. The battery can provide backup power should the external power source fail. Other types of power sources, such as photovoltaic devices, can also be used.

Alternative embodiments of network node 1360 can include additional components beyond those shown in FIG. 13 that can be responsible for providing certain aspects of the network node's functionality, including any of the functionality described herein and/or any functionality necessary to support the subject matter described herein. For example, network node 1360 can include user interface equipment to allow and/or facilitate input of information into network node 1360 and to allow and/or facilitate output of information from network node 1360. This can allow and/or facilitate a user to perform diagnostic, maintenance, repair, and other administrative functions for network node 1360.

In some embodiments, a wireless device (WD, e.g., WD 1310) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 can include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies can be integrated into the same or different chips or set of chips as other components within WD 1310.

Antenna 1311 can include one or more antennas or antenna arrays, configured to send and/or receive wireless signals, and is connected to interface 1314. In certain alternative embodiments, antenna 1311 can be separate from WD 1310 and be connectable to WD 1310 through an interface or port. Antenna 1311, interface 1314, and/or processing circuitry 1320 can be configured to perform any receiving or transmitting operations described herein as being performed by a WD. Any information, data and/or signals can be received from a network node and/or another WD. In some embodiments, radio front end circuitry and/or antenna 1311 can be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320 and can be configured to condition signals communicated between antenna 1311 and processing circuitry 1320. Radio front end circuitry 1312 can be coupled to or a part of antenna 1311. In some embodiments, WD 1310 may not include separate radio front end circuitry 1312; rather, processing circuitry 1320 can comprise radio front end circuitry and can be connected to antenna 1311. Similarly, in some embodiments, some or all of RF transceiver circuitry 1322 can be considered a part of interface 1314. Radio front end circuitry 1312 can receive digital data that is to be sent out to other network nodes or WDs via a wireless connection. Radio front end circuitry 1312 can convert the digital data into a radio signal having the appropriate channel and bandwidth parameters using a combination of filters 1318 and/or amplifiers 1316. The radio signal can then be transmitted via antenna 1311. Similarly, when receiving data, antenna 1311 can collect radio signals which are then converted into digital data by radio front end circuitry 1312. The digital data can be passed to processing circuitry 1320. In other embodiments, the interface can comprise different components and/or different combinations of components.

Processing circuitry 1320 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality can include providing any of the various wireless features or benefits discussed herein. For example, processing circuitry 1320 can execute instructions stored in device readable medium 1330 or in memory within processing circuitry 1320 to provide the functionality disclosed herein. For example, instructions (also referred to as a computer program product) stored in medium 1330 can include instructions that, when executed by processor 1320, can configure wireless device 1310 to perform operations corresponding to various exemplary methods (e.g., procedures) described herein.

As illustrated, processing circuitry 1320 includes one or more of RF transceiver circuitry 1322, baseband processing circuitry 1324, and application processing circuitry 1326. In other embodiments, the processing circuitry can comprise different components and/or different combinations of components. In certain embodiments processing circuitry 1320 of WD 1310 can comprise a SOC. In some embodiments, RF transceiver circuitry 1322, baseband processing circuitry 1324, and application processing circuitry 1326 can be on separate chips or sets of chips. In alternative embodiments, part or all of baseband processing circuitry 1324 and application processing circuitry 1326 can be combined into one chip or set of chips, and RF transceiver circuitry 1322 can be on a separate chip or set of chips. In still alternative embodiments, part or all of RF transceiver circuitry 1322 and baseband processing circuitry 1324 can be on the same chip or set of chips, and application processing circuitry 1326 can be on a separate chip or set of chips. In yet other alternative embodiments, part or all of RF transceiver circuitry 1322, baseband processing circuitry 1324, and application processing circuitry 1326 can be combined in the same chip or set of chips. In some embodiments, RF transceiver circuitry 1322 can be a part of interface 1314. RF transceiver circuitry 1322 can condition RF signals for processing circuitry 1320.

In certain embodiments, some or all of the functionality described herein as being performed by a WD can be provided by processing circuitry 1320 executing instructions stored on device readable medium 1330, which in certain embodiments can be a computer-readable storage medium. In alternative embodiments, some or all of the functionality can be provided by processing circuitry 1320 without executing instructions stored on a separate or discrete device readable storage medium, such as in a hard-wired manner In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 can be configured to perform any determining, calculating, or similar operations (e.g., certain obtaining operations) described herein as being performed by a WD. These operations, as performed by processing circuitry 1320, can include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 can be operable to store a computer program, software, an application including one or more of logic, rules, code, tables, etc. and/or other instructions capable of being executed by processing circuitry 1320. Device readable medium 1330 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1320. In some embodiments, processing circuitry 1320 and device readable medium 1330 can be considered to be integrated.

User interface equipment 1332 can include components that allow and/or facilitate a human user to interact with WD 1310. Such interaction can be of many forms, such as visual, audial, tactile, etc. User interface equipment 1332 can be operable to produce output to the user and to allow and/or facilitate the user to provide input to WD 1310. The type of interaction can vary depending on the type of user interface equipment 1332 installed in WD 1310. For example, if WD 1310 is a smart phone, the interaction can be via a touch screen; if WD 1310 is a smart meter, the interaction can be through a screen that provides usage (e.g., the number of gallons used) or a speaker that provides an audible alert (e.g., if smoke is detected). User interface equipment 1332 can include input interfaces, devices and circuits, and output interfaces, devices and circuits. User interface equipment 1332 can be configured to allow and/or facilitate input of information into WD 1310 and is connected to processing circuitry 1320 to allow and/or facilitate processing circuitry 1320 to process the input information. User interface equipment 1332 can include, for example, a microphone, a proximity or other sensor, keys/buttons, a touch display, one or more cameras, a USB port, or other input circuitry. User interface equipment 1332 is also configured to allow and/or facilitate output of information from WD 1310, and to allow and/or facilitate processing circuitry 1320 to output information from WD 1310. User interface equipment 1332 can include, for example, a speaker, a display, vibrating circuitry, a USB port, a headphone interface, or other output circuitry. Using one or more input and output interfaces, devices, and circuits, of user interface equipment 1332, WD 1310 can communicate with end users and/or the wireless network and allow and/or facilitate them to benefit from the functionality described herein.

Auxiliary equipment 1334 is operable to provide more specific functionality which may not be generally performed by WDs. This can comprise specialized sensors for doing measurements for various purposes, interfaces for additional types of communication such as wired communications, etc. The inclusion and type of components of auxiliary equipment 1334 can vary depending on the embodiment and/or scenario.

Power source 1336 can, in some embodiments, be in the form of a battery or battery pack. Other types of power sources, such as an external power source (e.g., an electricity outlet), photovoltaic devices or power cells, can also be used. WD 1310 can further comprise power circuitry 1337 for delivering power from power source 1336 to the various parts of WD 1310 which need power from power source 1336 to carry out any functionality described or indicated herein. Power circuitry 1337 can in certain embodiments comprise power management circuitry. Power circuitry 1337 can additionally or alternatively be operable to receive power from an external power source; in which case WD 1310 can be connectable to the external power source (such as an electricity outlet) via input circuitry or an interface such as an electrical power cable. Power circuitry 1337 can also in certain embodiments be operable to deliver power from an external power source to power source 1336. This can be, for example, for the charging of power source 1336. Power circuitry 1337 can perform any converting or other modification to the power from power source 1336 to make it suitable for supply to the respective components of WD 1310.

Figure 14:
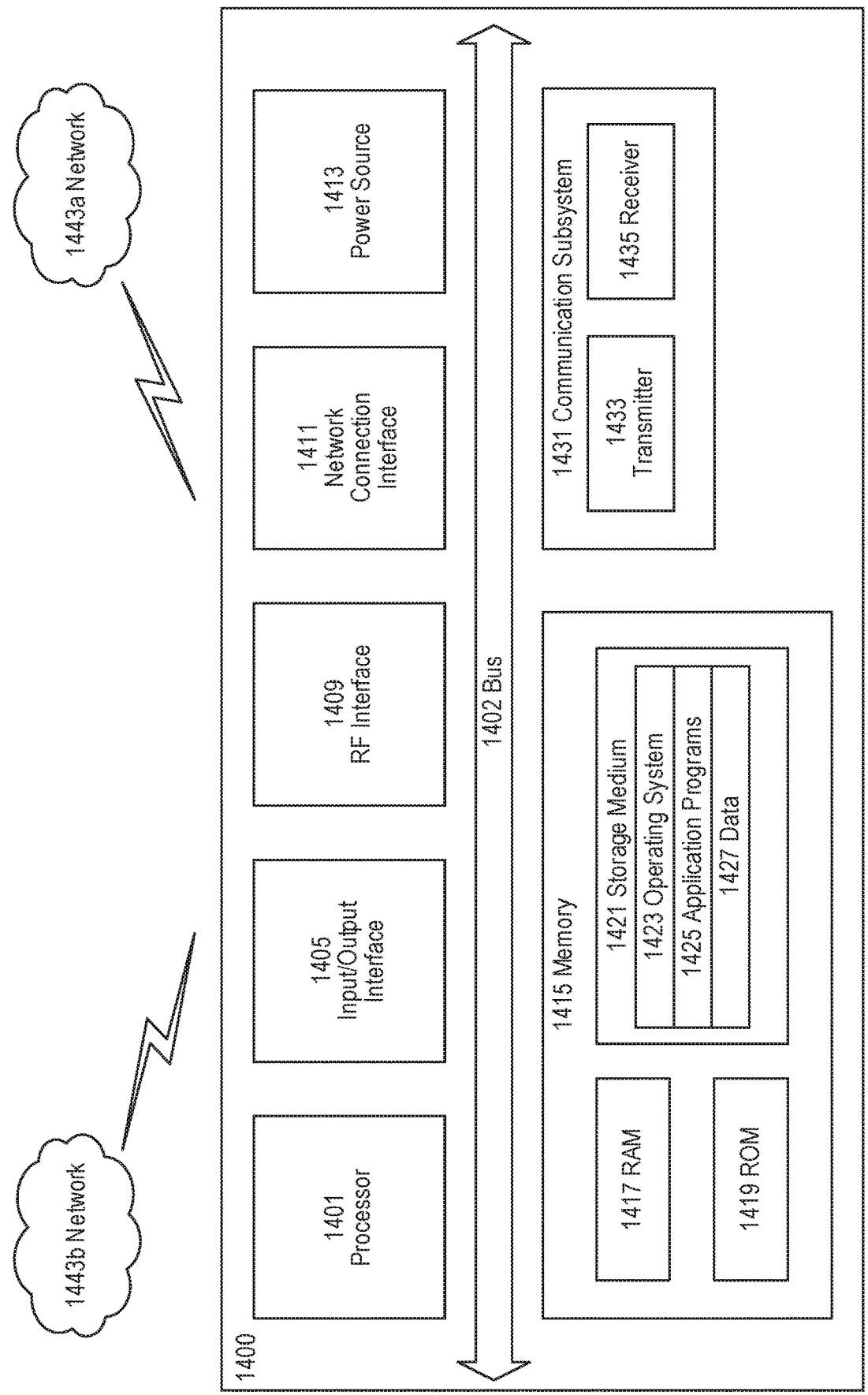
FIG. 14 illustrates an exemplary UE, according to various exemplary embodiments of the present disclosure.

FIG. 14 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 14200 can be any UE identified by the $3^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 can include other similar types of information. Certain UEs can utilize all of the components shown in FIG. 14, or only a subset of the components. The level of integration between the components can vary from one UE to another UE. Further, certain UEs can contain multiple instances of a component, such as multiple processors, memories, transceivers, transmitters, receivers, etc.

In FIG. 14, processing circuitry 1401 can be configured to process computer instructions and data. Processing circuitry 1401 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 can include two central processing units (CPUs). Data can be information in a form suitable for use by a computer.

In the depicted embodiment, input/output interface 1405 can be configured to provide a communication interface to an input device, output device, or input and output device. UE 1400 can be configured to use an output device via input/output interface 1405. An output device can use the same type of interface port as an input device. For example, a USB port can be used to provide input to and output from UE 1400. The output device can be a speaker, a sound card, a video card, a display, a monitor, a printer, an actuator, an emitter, a smartcard, another output device, or any combination thereof. UE 1400 can be configured to use an input device via input/output interface 1405 to allow and/or facilitate a user to capture information into UE 1400. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 14, RF interface 1409 can be configured to provide a communication interface to RF components such as a transmitter, a receiver, and an antenna. Network connection interface 1411 can be configured to provide a communication interface to network 1443*a*. Network 1443*a* can encompass wired and/or wireless networks such as a local-area network (LAN), a wide-area network (WAN), a computer network, a wireless network, a telecommunications network, another like network or any combination thereof. For example, network 1443*a* can comprise a Wi-Fi network. Network connection interface 1411 can be configured to include a receiver and a transmitter interface used to communicate with one or more other devices over a communication network according to one or more communication protocols, such as Ethernet, TCP/IP, SONET, ATM, or the like. Network connection interface 1411 can implement receiver and transmitter functionality appropriate to the communication network links (e.g., optical, electrical, and the like). The transmitter and receiver functions can share circuit components, software or firmware, or alternatively can be implemented separately.

RAM 1417 can be configured to interface via bus 1402 to processing circuitry 1401 to provide storage or caching of data or computer instructions during the execution of software programs such as the operating system, application programs, and device drivers. ROM 1419 can be configured to provide computer instructions or data to processing circuitry 1401. For example, ROM 1419 can be configured to store invariant low-level system code or data for basic system functions such as basic input and output (I/O), startup, or reception of keystrokes from a keyboard that are stored in a non-volatile memory. Storage medium 1421 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1421 can be configured to include operating system 1423; application program 1425 such as a web browser application, a widget or gadget engine or another application; and data file 1427. Storage medium 1421 can store, for use by UE 1400, any of a variety of various operating systems or combinations of operating systems. For example, application program 1425 can include executable program instructions (also referred to as a computer program product) that, when executed by processor 1401, can configure UE 1400 to perform operations corresponding to various exemplary methods (e.g., procedures) described herein.

Storage medium 1421 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 can allow and/or facilitate UE 1400 to access computer-executable instructions, application programs or the like, stored on transitory or non-transitory memory media, to off-load data, or to upload data. An article of manufacture, such as one utilizing a communication system can be tangibly embodied in storage medium 1421, which can comprise a device readable medium.

In FIG. 14, processing circuitry 1401 can be configured to communicate with network 1443*b* using communication subsystem 1431. Network 1443*a* and network 1443*b* can be the same network or networks or different network or networks. Communication subsystem 1431 can be configured to include one or more transceivers used to communicate with network 1443*b*. For example, communication subsystem 1431 can be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver can include transmitter 1433 and/or receiver 1435 to implement transmitter or receiver functionality, respectively, appropriate to the RAN links (e.g., frequency allocations and the like). Further, transmitter 1433 and receiver 1435 of each transceiver can share circuit components, software or firmware, or alternatively can be implemented separately.

In the illustrated embodiment, the communication functions of communication subsystem 1431 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 can include cellular communication, Wi-Fi communication, Bluetooth communication, and GPS communication. Network 1443*b* can encompass wired and/or wireless networks such as a local-area network (LAN), a wide-area network (WAN), a computer network, a wireless network, a telecommunications network, another like network or any combination thereof. For example, network 1443*b* can be a cellular network, a Wi-Fi network, and/or a near-field network. Power source 1413 can be configured to provide alternating current (AC) or direct current (DC) power to components of UE 1400.

The features, benefits and/or functions described herein can be implemented in one of the components of UE 1400 or partitioned across multiple components of UE 1400. Further, the features, benefits, and/or functions described herein can be implemented in any combination of hardware, software or firmware. In one example, communication subsystem 1431 can be configured to include any of the components described herein. Further, processing circuitry 1401 can be configured to communicate with any of such components over bus 1402. In another example, any of such components can be represented by program instructions stored in memory that when executed by processing circuitry 1401 perform the corresponding functions described herein. In another example, the functionality of any of such components can be partitioned between processing circuitry 1401 and communication subsystem 1431. In another example, the non-computationally intensive functions of any of such components can be implemented in software or firmware and the computationally intensive functions can be implemented in hardware.

Figure 15:
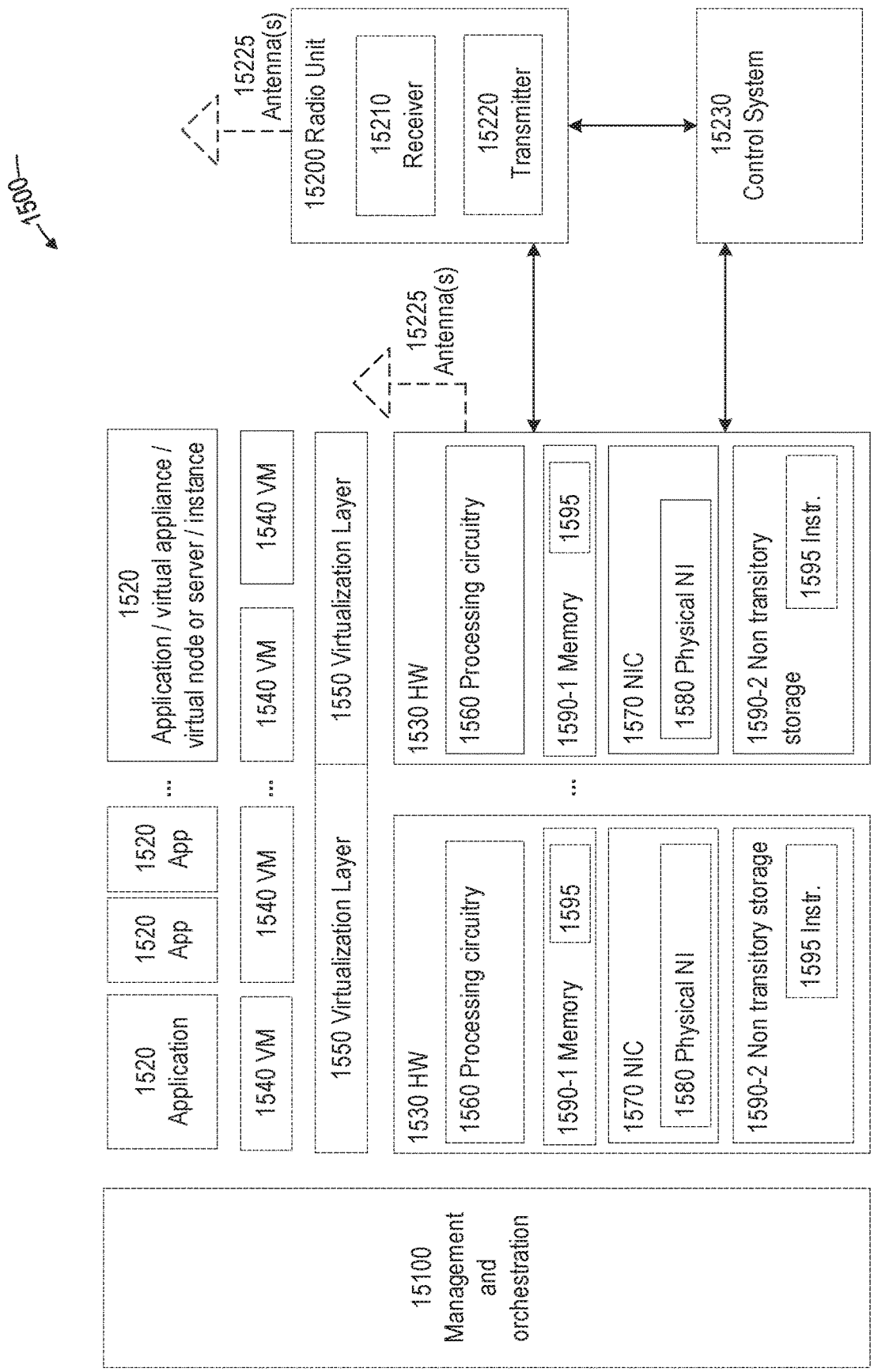
FIG. 15 is a block diagram illustrating an exemplary virtualization environment usable for implementing various exemplary embodiments of the present disclosure.

FIG. 15 is a schematic block diagram illustrating a virtualization environment 1500 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node can be entirely virtualized.

The functions can be implemented by one or more applications 1520 (which can alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500, comprises general-purpose or special-purpose network hardware devices (or nodes) 1530 comprising a set of one or more processors or processing circuitry 1560, which can be commercial off-the-shelf (COTS) processors, dedicated Application Specific Integrated Circuits (ASICs), or any other type of processing circuitry including digital or analog hardware components or special purpose processors. Each hardware device can comprise memory 1590-1 which can be non-persistent memory for temporarily storing instructions 1595 or software executed by processing circuitry 1560. For example, instructions 1595 can include program instructions (also referred to as a computer program product) that, when executed by processing circuitry 1560, can configure hardware node 1520 to perform operations corresponding to various exemplary methods (e.g., procedures) described herein. Such operations can also be attributed to virtual node(s) 1520 that is/are hosted by hardware node 1530.

Each hardware device can comprise one or more network interface controllers (NICs) 1570, also known as network interface cards, which include physical network interface 1580. Each hardware device can also include non-transitory, persistent, machine-readable storage media 1590-2 having stored therein software 1595 and/or instructions executable by processing circuitry 1560. Software 1595 can include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and can be run by a corresponding virtualization layer 1550 or hypervisor. Different embodiments of the instance of virtual appliance 1520 can be implemented on one or more of virtual machines 1540, and the implementations can be made in different ways.

During operation, processing circuitry 1560 executes software 1595 to instantiate the hypervisor or virtualization layer 1550, which can sometimes be referred to as a virtual machine monitor (VMM). Virtualization layer 1550 can present a virtual operating platform that appears like networking hardware to virtual machine 1540.

As shown in FIG. 15, hardware 1530 can be a standalone network node with generic or specific components. Hardware 1530 can comprise antenna 15225 and can implement some functions via virtualization. Alternatively, hardware 1530 can be part of a larger cluster of hardware (e.g., such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1540 can be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 can be coupled to one or more antennas 15225. Radio units 15200 can communicate directly with hardware nodes 1530 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 15230, which can alternatively be used for communication between the hardware nodes 1530 and radio units 15200.

Figure 16:
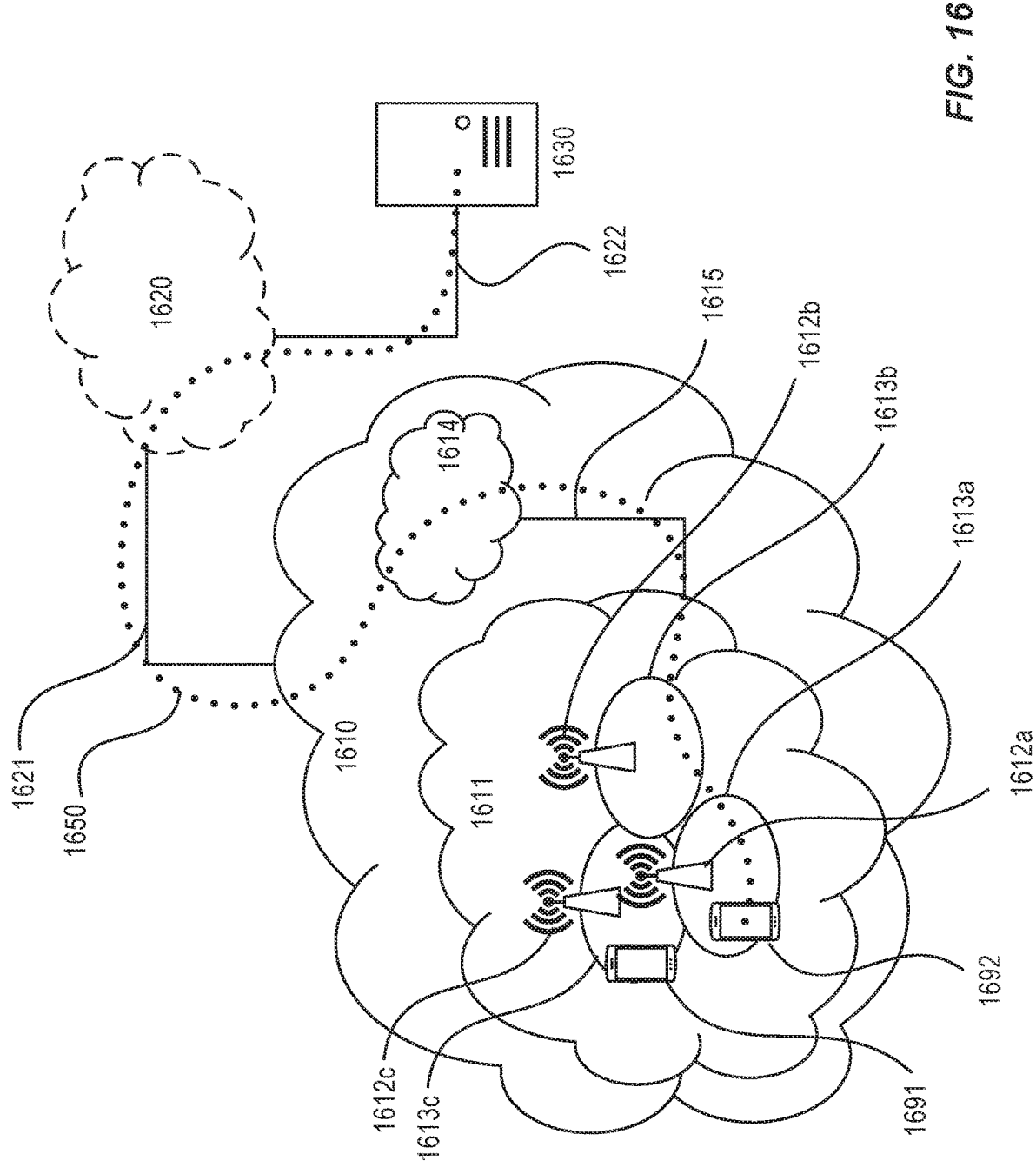
FIGS. 16-17 are block diagrams of exemplary communication systems and/or networks, according to various exemplary embodiments of the present disclosure.

With reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612*a*, 1612*b*, 1612*c*, such as NBs, eNBs, gNBs or other types of wireless access points, each defining a corresponding coverage area 1613*a*, 1613*b*, 1613*c*. Each base station 1612*a*, 1612*b*, 1612*c* is connectable to core network 1614 over a wired or wireless connection 1615. A first UE 1691 located in coverage area 1613*c* can be configured to wirelessly connect to, or be paged by, the corresponding base station 1612*c*. A second UE 1692 in coverage area 1613*a* is wirelessly connectable to the corresponding base station 1612*a*. While a plurality of UEs 1691, 1692 are illustrated in this example, the disclosed embodiments are equally applicable to a situation where a sole UE is in the coverage area or where a sole UE is connecting to the Telecommunication network 1610 is itself connected to host computer 1630, which can be embodied in the hardware and/or software of a standalone server, a cloud-implemented server, a distributed server or as processing resources in a server farm. Host computer 1630 can be under the ownership or control of a service provider or can be operated by the service provider or on behalf of the service provider. Connections 1621 and 1622 between telecommunication network 1610 and host computer 1630 can extend directly from core network 1614 to host computer 1630 or can go via an optional intermediate network 1620. Intermediate network 1620 can be one of, or a combination of more than one of, a public, private or hosted network; intermediate network 1620, if any, can be a backbone network or the Internet; in particular, intermediate network 1620 can comprise two or more sub-networks (not shown).

The communication system of FIG. 16 as a whole enables connectivity between the connected UEs 1691, 1692 and host computer 1630. The connectivity can be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 can be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Example implementations, in accordance with an embodiment, of the UE, base station and host computer discussed in the preceding paragraphs will now be described with reference to FIG. 17. In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which can have storage and/or processing capabilities. In particular, processing circuitry 1718 can comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 can be operable to provide a service to a remote user, such as UE 1730 connecting via OTT connection 1750 terminating at UE 1730 and host computer 1710. In providing the service to the remote user, host application 1712 can provide user data which is transmitted using OTT connection 1750.

Communication system 1700 can also include base station 1720 provided in a telecommunication system and comprising hardware 1725 enabling it to communicate with host computer 1710 and with UE 1730. Hardware 1725 can include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 can be configured to facilitate connection 1760 to host computer 1710. Connection 1760 can be direct, or it can pass through a core network (not shown in FIG. 17) of the telecommunication system and/or through one or more intermediate networks outside the telecommunication system. In the embodiment shown, hardware 1725 of base station 1720 can also include processing circuitry 1728, which can comprise one or more programmable processors, application-specific integrated circuits, field programmable gate arrays or combinations of these (not shown) adapted to execute instructions.

Base station 1720 also includes software 1721 stored internally or accessible via an external connection. For example, software 1721 can include program instructions (also referred to as a computer program product) that, when executed by processing circuitry 1728, can configure base station 1720 to perform operations corresponding to various exemplary methods (e.g., procedures) described herein.

Communication system 1700 can also include UE 1730 already referred to, whose hardware 1735 can include radio interface 1737 configured to set up and maintain wireless connection 1770 with a base station serving a coverage area in which UE 1730 is currently located. Hardware 1735 of UE 1730 can also include processing circuitry 1738, which can comprise one or more programmable processors, application-specific integrated circuits, field programmable gate arrays or combinations of these (not shown) adapted to execute instructions.

UE 1730 also includes software 1731, which is stored in or accessible by UE 1730 and executable by processing circuitry 1738. Software 1731 includes client application 1732. Client application 1732 can be operable to provide a service to a human or non-human user via UE 1730, with the support of host computer 1710. In host computer 1710, an executing host application 1712 can communicate with the executing client application 1732 via OTT connection 1750 terminating at UE 1730 and host computer 1710. In providing the service to the user, client application 1732 can receive request data from host application 1712 and provide user data in response to the request data. OTT connection 1750 can transfer both the request data and the user data. Client application 1732 can interact with the user to generate the user data that it provides. Software 1731 can also include program instructions (also referred to as a computer program product) that, when executed by processing circuitry 1738, can configure UE 1730 to perform operations corresponding to various exemplary methods (e.g., procedures) described herein.

Figure 17:
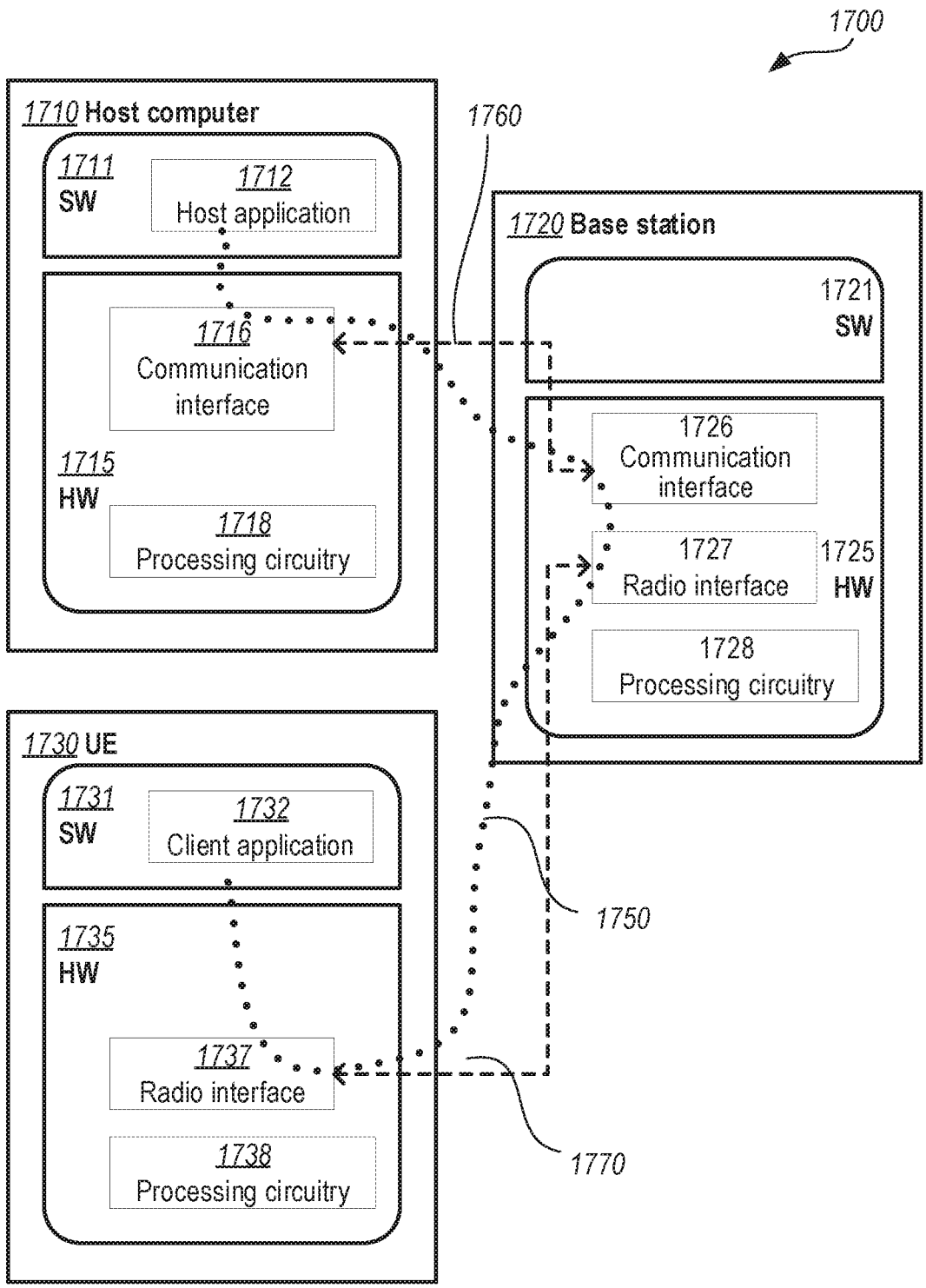

It is noted that host computer 1710, base station 1720 and UE 1730 illustrated in FIG. 17 can be similar or identical to host computer 1230, one of base stations 1612a, 1612b, 1612c and one of UEs 1691, 1692 of FIG. 16, respectively. This is to say, the inner workings of these entities can be as shown in FIG. 17 and independently, the surrounding network topology can be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure can determine the routing, which it can be configured to hide from UE 1730 or from the service provider operating host computer 1710, or both. While OTT connection 1750 is active, the network infrastructure can further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments improve the performance of OTT services provided to UE 1730 using OTT connection 1750, in which wireless connection 1770 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1750 between host computer 1710 and UE 1730, in response to variations in the measurement results. The measurement procedure and/or the network functionality for reconfiguring OTT connection 1750 can be implemented in software 1711 and hardware 1715 of host computer 1710 or in software 1731 and hardware 1735 of UE 1730, or both. In embodiments, sensors (not shown) can be deployed in or in association with communication devices through which OTT connection 1750 passes; the sensors can participate in the measurement procedure by supplying values of the monitored quantities exemplified above, or supplying values of other physical quantities from which software 1711, 1731 can compute or estimate the monitored quantities. The reconfiguring of OTT connection 1750 can include message format, retransmission settings, preferred routing etc.; the reconfiguring need not affect base station 1720, and it can be unknown or imperceptible to base station 1720. Such procedures and functionalities can be known and practiced in the art. In certain embodiments, measurements can involve proprietary UE signaling facilitating host computer 1710's measurements of throughput, propagation times, latency and the like. The measurements can be implemented in that software 1711 and 1731 causes messages to be transmitted, in particular empty or 'dummy' messages, using OTT connection 1750 while it monitors propagation times, errors, etc.

FIG. 18 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 18 will be included in this section. In step 1810, the host computer provides user data. In substep 1811 (which can be optional) of step 1810, the host computer provides the user data by executing a host application. In step 1820, the host computer initiates a transmission carrying the user data to the UE. In step 1830 (which can be optional), the base station transmits to the UE the user data which was carried in the transmission that the host computer initiated, in accordance with the teachings of the embodiments described throughout this disclosure. In step 1840 (which can also be optional), the UE executes a client application associated with the host application executed by the host computer.

FIG. 19 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission can pass via the base station, in accordance with the teachings of the embodiments described throughout this disclosure. In step 1930 (which can be optional), the UE receives the user data carried in the transmission.

FIG. 20 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 20 will be included in this section. In step 2010 (which can be optional), the UE receives input data provided by the host computer. Additionally or alternatively, in step 2020, the UE provides user data. In substep 2021 (which can be optional) of step 2020, the UE provides the user data by executing a client application. In substep 2011 (which can be optional) of step 2010, the UE executes a client application which provides the user data in reaction to the received input data provided by the host computer. In providing the user data, the executed client application can further consider user input received from the user. Regardless of the specific manner in which the user data was provided, the UE initiates, in substep 2030 (which can be optional), transmission of the user data to the host computer. In step 2040 of the method, the host computer receives the user data transmitted from the UE, in accordance with the teachings of the embodiments described throughout this disclosure.

FIG. 21 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 21 will be included in this section. In step 2110 (which can be optional), in accordance with the teachings of the embodiments described throughout this disclosure, the base station receives user data from the UE. In step 2120 (which can be optional), the base station initiates transmission of the received user data to the host computer. In step 2130 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated examples:

Group A Embodiments

1. A method performed by a wireless device for determining which mobility function the wireless device shall use upon triggering of a configured condition, the method comprising:
  Receiving conditional mobility configuration comprising at least the configuration of one triggering condition;
  Monitoring of the conditional mobility triggering condition upon the reception of the configuration; and
  Upon the triggering of the condition, selecting between conditional handover or conditional resume towards a cell-X based on a selection rule.
2. The method of embodiment 1, wherein the conditional mobility configuration comprises one or more validity timers.
3. The method of any of the previous embodiments, further comprising:
  providing user data; and
  forwarding the user data to a host computer via the transmission to the base station.

Group B Embodiments

4. A method performed by a base station for determining which mobility function a wireless device shall use upon triggering of a configured condition, the method comprising:
  Deciding conditional mobility configuration to be used by a UE; and
  Sending conditional mobility configuration comprising at least the configuration of one triggering condition, wherein the UE monitors of the conditional mobility triggering condition upon the reception of the configuration and upon the triggering of the condition, selects between conditional handover or conditional resume towards a cell-X based on a selection rule.
5. The method of embodiment 4, further comprising including one or more validity timers associated with the conditional mobility configuration.
6. The method of any of the previous embodiments, further comprising:
  obtaining user data; and
  forwarding the user data to a host computer or a wireless device.

Group C Embodiments

7. A wireless device for determining which mobility function the wireless device shall use upon triggering of a configured condition, the wireless device comprising:
  processing circuitry configured to perform any of the steps of any of the Group A embodiments; and
  power supply circuitry configured to supply power to the wireless device.
8. A base station for determining which mobility function a wireless device shall use upon triggering of a configured condition, the base station comprising:
  processing circuitry configured to perform any of the steps of any of the Group B embodiments;
  power supply circuitry configured to supply power to the base station.
9. A user equipment (UE) for determining which mobility function the UE shall use upon triggering of a configured condition, the UE comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of the Group A embodiments;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.
10. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of any of the Group B embodiments.
11. The communication system of the previous embodiment further including the base station.
12. The communication system of the previous 2 embodiments, further including the UE, wherein the UE is configured to communicate with the base station.
13. The communication system of the previous 3 embodiments, wherein:
  the processing circuitry of the host computer is configured to execute a host application, thereby providing the user data; and
  the UE comprises processing circuitry configured to execute a client application associated with the host application.
14. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps of any of the Group B embodiments.
15. The method of the previous embodiment, further comprising, at the base station, transmitting the user data.
16. The method of the previous 2 embodiments, wherein the user data is provided at the host computer by executing a host application, the method further comprising, at the UE, executing a client application associated with the host application.

17. A user equipment (UE) configured to communicate with a base station, the UE comprising a radio interface and processing circuitry configured to performs the of the previous 3 embodiments.

18. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of the Group A embodiments.

19. The communication system of the previous embodiment, wherein the cellular network further includes a base station configured to communicate with the UE.

20. The communication system of the previous 2 embodiments, wherein:
   the processing circuitry of the host computer is configured to execute a host application, thereby providing the user data; and
   the UE's processing circuitry is configured to execute a client application associated with the host application.

21. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.

22. The method of the previous embodiment, further comprising at the UE, receiving the user data from the base station.

23. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of the Group A embodiments.

24. The communication system of the previous embodiment, further including the UE.

25. The communication system of the previous 2 embodiments, further including the base station, wherein the base station comprises a radio interface configured to communicate with the UE and a communication interface configured to forward to the host computer the user data carried by a transmission from the UE to the base station.

26. The communication system of the previous 3 embodiments, wherein:
   the processing circuitry of the host computer is configured to execute a host application; and
   the UE's processing circuitry is configured to execute a client application associated with the host application, thereby providing the user data.

27. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.

28. A method implemented in a communication system including a host computer, a base station and a user equipment (UE), the method comprising:
   at the host computer, receiving user data transmitted to the base station from the UE,
   wherein the UE performs any of the steps of any of the Group A embodiments.

29. The method of the previous embodiment, further comprising, at the UE, providing the user data to the base station.

30. The method of the previous 2 embodiments, further comprising:
   at the UE, executing a client application, thereby providing the user data to be transmitted; and
   at the host computer, executing a host application associated with the client application.

31. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.

32. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

33. The communication system of the previous embodiment further including the base station.

34. The communication system of the previous 2 embodiments, further including the UE, wherein the UE is configured to communicate with the base station.

35. The communication system of the previous 3 embodiments, wherein:
   the processing circuitry of the host computer is configured to execute a host application;
   the UE is configured to execute a client application associated with the host application, thereby providing the user data to be received by the host computer.

36. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.

37. The method of the previous embodiment, further comprising at the base station, receiving the user data from the UE.

38. The method of the previous 2 embodiments, further comprising at the base station, initiating a transmission of the received user data to the host computer.

The invention claimed is:

1. A conditional mobility method performed by a user equipment (UE) in a wireless network, the method comprising:
   receiving, from a network node via a serving cell, a conditional mobility configuration related to a plurality of mobility procedures towards one or more candidate target entities, wherein the plurality of mobility procedures includes conditional handover and conditional resume, and wherein the conditional mobility configuration includes one or more triggering conditions for the plurality of mobility procedures;

monitoring for the one or more triggering conditions based on measurements of radio signals associated with at least one of the following: the candidate target entities and the serving cell; and based on detecting a particular triggering condition:
performing a particular one of the mobility procedures towards a particular one of the candidate target entities; and
selecting at least one of the particular candidate target entity and the particular mobility procedure based on a selection rule.

2. The method of claim 1, wherein the candidate target entities include any of the following:
one or more cells, other than the serving cell;
one or more frequencies;
one or more beams; and
one or more reference signals associated with respective beams.

3. The method of claim 1, wherein:
the candidate target entities include a plurality of candidate target cells; and
the particular triggering condition is that a signal strength of the serving cell is a predetermined amount below a signal strength of a particular candidate target cell.

4. The method of claim 1, wherein the conditional mobility configuration includes:
one or more first configurations, for conditional handover, corresponding to respective one or more first candidate target entities; and
one or more second configurations, for conditional resume, corresponding to respective one or more second candidate target entities.

5. The method of claim 4, wherein:
each first configuration includes an RRCReconfiguration message prepared by a target node associated with the corresponding first candidate target entity; and
each second configuration includes an identifier of a UE context.

6. The method of claim 4, wherein selecting the particular mobility procedure based on the selection rule comprises:
selecting conditional handover when the particular candidate target entity is one of the first candidate target entities; and
selecting conditional resume when the particular candidate target entity is one of the second candidate target entities.

7. The method of claim 4, wherein one of the following applies:
the first candidate target entities include one or more first cells served by the network node and the second candidate target entities include one or more second cells served by other network nodes; or
the first candidate target entities include one or more first cells associated with a first measurement object and the second candidate target entities include one or more second cells associated with a second measurement object.

8. The method of claim 4, wherein:
each first configuration includes one or more first triggering conditions;
each second configuration includes one or more second triggering conditions; and
selecting the particular mobility procedure based on the selection rule comprises:
selecting conditional handover when the particular triggering condition is one of the first triggering conditions; and
selecting conditional resume when the particular triggering condition is one of the second triggering conditions.

9. The method of claim 8, wherein:
the first candidate target entities and the second candidate target entities include a common candidate target entity; and
the first and second triggering conditions associated with the common candidate target entity are different.

10. The method of claim 1, wherein:
the particular triggering condition is that the serving cell signal strength is a predetermined amount below a first threshold;
the candidate target entities include a plurality of frequencies arranged in order of priority and a plurality of candidate target cells; and
selecting the particular candidate target entity based on the selection rule comprises:
determining signal strengths of the candidate target cells for a highest-priority frequency;
selecting the candidate target cell with the highest signal strength when any of the determined signal strengths for the candidate target cells is above a second threshold; and
when none of the determined signal strengths for the candidate target cells are above the threshold, repeating the determining and selecting operations for a next highest-priority frequency.

11. The method of claim 1, wherein:
the conditional mobility configuration comprises one or more validity timers;
monitoring for the triggering conditions further comprises initiating the validity timers; and
selecting the particular mobility procedure is further based on whether a validity timer associated with the particular mobility procedure and with the particular candidate target entity has expired.

12. A user equipment (UE) configured for conditional mobility between cells in a wireless network, the UE comprising:
radio interface circuitry configured to communicate with one or more network nodes via one or more cells in the wireless network; and
processing circuitry operably coupled with the radio interface circuitry, whereby the processing circuitry and the radio interface circuitry are configured to perform operations corresponding to the method of claim 1.

13. A non-transitory, computer-readable medium storing program instructions that, when executed by processing circuitry of a user equipment (UE), configure the UE to perform operations corresponding to the method of claim 1.

14. A method, performed by a network node in a wireless network, for configuring conditional mobility of a user equipment (UE) in the wireless network, the method comprising:
determining, for the UE, a conditional mobility configuration related to a plurality of mobility procedures towards one or more candidate target entities, wherein the plurality of mobility procedures includes conditional handover and conditional resume, and wherein the conditional mobility configuration includes one or more triggering conditions for the plurality of mobility procedures; and sending the conditional mobility configuration to the UE via a serving cell.

15. The method of claim 14, wherein the candidate target entities include any of the following:
   one or more cells, other than the serving cell;
   one or more frequencies;
   one or more beams; and
   one or more reference signals associated with respective beams.

16. The method of claim 14, wherein:
   the candidate target entities include a candidate target cell; and
   one of the triggering conditions is that a signal strength of the serving cell is a predetermined amount below a signal strength of the candidate target cell.

17. The method of claim 14, wherein the conditional mobility configuration includes:
   one or more first configurations, for conditional handover, corresponding to respective one or more first candidate target entities; and
   one or more second configurations, for conditional resume, corresponding to respective one or more second candidate target entities.

18. The method of claim 17, wherein:
   each first configuration includes an RRCReconfiguration message prepared by a target node associated with the corresponding first candidate target entity; and
   each second configuration includes an identifier of a UE context.

19. The method of claim 17, wherein one of the following applies:
   the first candidate target entities include one or more first cells served by the network node and the second candidate target entities include one or more second cells served by other network nodes; or
   the first candidate target entities include one or more first cells associated with a first measurement object and the second candidate target entities include one or more second cells associated with a second measurement object.

20. The method of claim 17, wherein:
   each first configuration includes one or more first triggering conditions; and
   each second configuration includes one or more second triggering conditions.

21. The method of claim 20, wherein:
   the first candidate target entities and the second candidate target entities include a common candidate target entity; and
   the first and second triggering conditions associated with the common candidate target entity are different.

22. The method of claim 14, wherein:
   one of the triggering conditions is that a signal strength of the serving cell is a predetermined amount below a first threshold; and
   the candidate target entities include:
      a plurality of frequencies arranged in order of priority, and
      a plurality of candidate target cells.

23. A network node, of a wireless network, arranged to configure conditional mobility of one or more user equipment (UEs) between cells of the wireless network, the network node comprising:
   communication interface circuitry configured to communicate with the one or more UEs; and
   processing circuitry operably coupled with the communication interface circuitry, whereby the processing circuitry and the communication interface circuitry are configured to perform operations corresponding to the method of claim 14.

24. A non-transitory, computer-readable medium storing program instructions that, when executed by processing circuitry of a network node in a wireless network, configure the network node to perform operations corresponding to the method of claim 14.

\* \* \* \* \*

UNITED STATES PATENT AND TRADEMARK OFFICE
CERTIFICATE OF CORRECTION

PATENT NO. : 11,924,704 B2
APPLICATION NO. : 17/294875
DATED : March 5, 2024
INVENTOR(S) : Da Silva et al.

Page 1 of 1

It is certified that error appears in the above-identified patent and that said Letters Patent is hereby corrected as shown below:

In the Specification

In Column 2, Line 56, delete "51" and insert -- S1 --, therefor.

In Column 3, Line 57, delete "uplink" and insert -- uplink. --, therefor.

In Column 4, Line 57, delete "SRB ibis," and insert -- SRB1bis, --, therefor.

In Column 11, Line 38, delete "SLAP" and insert -- S1AP --, therefor.

In Column 14, Line 67, delete "command"" and insert -- command". --, therefor.

In Column 20, Lines 34-35, delete "cell-X2, cell-Xn);" and insert -- cell-X2, . . . , cell-Xn); --, therefor.

In Column 21, Line 62, delete "cell-X1, cell-Xn)" and insert -- cell-X1, . . . , cell-Xn) --, therefor.

In Column 21, Line 65, delete "cell-X1', cell-Xn')" and insert -- cell-X1', . . . , cell-Xn') --, therefor.

In Column 22, Line 7, delete "cell-X1, cell-Xn)" and insert -- cell-X1, . . . , cell-Xn) --, therefor.

In Column 23, Line 16, delete "manner" and insert -- manner. --, therefor.

In Column 24, Line 24, delete "validity Timer" and insert -- validityTimer --, therefor.

In Column 33, Line 15, delete "manner" and insert -- manner. --, therefor.

Signed and Sealed this
Twenty-second Day of October, 2024

Katherine Kelly Vidal
*Director of the United States Patent and Trademark Office*